United States Patent [19]

Yanagimachi et al.

[11] 3,936,595
[45] Feb. 3, 1976

[54] SIGNAL TRANSMISSION SYSTEM FOR TRANSMITTING PROGRAMED INFORMATION SUCH AS PROGRAMED INSTRUCTION

[75] Inventors: Akio Yanagimachi, Kawasaki; Takashi Uehara, Inagi; Tetsuo Yamamoto, Machida; Hisakichi Yamane, Tokyo; Eiichi Sawabe, Machida; Takehiko Yoshino, Yokohama; Teruhiro Takezawa, Komae; Michio Masuda, Tokyo; Hiroaki Nabeyama, Yokohama; Masaaki Fukuda, Kodaira; Tatsuo Kayano, Hachioji, all of Japan

[73] Assignees: Nippon Hoso Kyokai; Hitachi, Ltd.; Hitachi Electronics Co., Ltd., all of Tokyo, Japan

[22] Filed: Aug. 29, 1973

[21] Appl. No.: 392,557

[30] Foreign Application Priority Data
Sept. 4, 1972  Japan.................................. 47-88553

[52] U.S. Cl............. 178/5.6; 35/9 R; 178/DIG. 23; 178/DIG. 35
[51] Int. Cl.$^2$........................ H04N 7/08; G09B 7/04
[58] Field of Search........ 178/5.6, DIG. 35, DIG. 23, 178/5.8 R; 35/9 R; 179/15 BY

[56] References Cited
UNITED STATES PATENTS

| | | | |
|---|---|---|---|
| 3,245,157 | 4/1966 | Laviana | 35/9 |
| 3,546,791 | 12/1970 | Koos et al. | 35/9 |
| 3,566,482 | 3/1971 | Morchand | 35/9 |
| 3,606,688 | 9/1971 | Zawels et al. | 35/9 |
| 3,757,225 | 9/1973 | Ulicki | 325/308 |
| 3,760,275 | 9/1973 | Ohsawa et al. | 325/31 |

Primary Examiner—Benedict V. Safourek
Assistant Examiner—Mitchell Saffian
Attorney, Agent, or Firm—Stevens, Davis, Miller & Mosher

[57] ABSTRACT

A signal transmission system for transmitting programed information such as a programed instruction comprising at a transmitter end circuitry for producing a number of program materials and a control signal which is used at a receiver end to control the manner of sequentially connecting program materials in accordance with a response input of a student to construct at least one significant program. The system comprises at the receiver end circuitry for detecting the control signal, circuitry for extracting desired program materials in a desired sequence with the aid of the control signal in accordance with the response input of the student and apparatus for displaying the extracted desired program materials.

24 Claims, 19 Drawing Figures

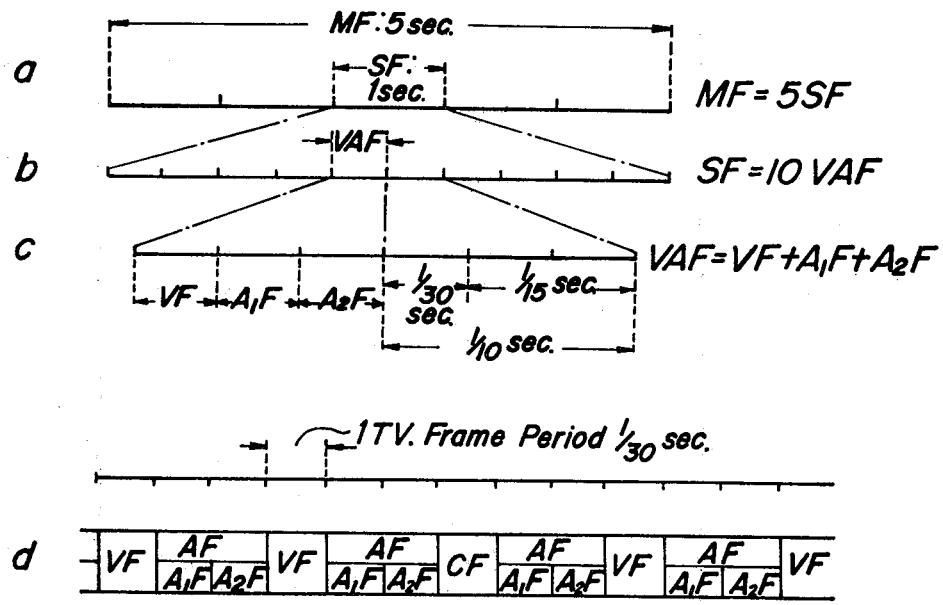
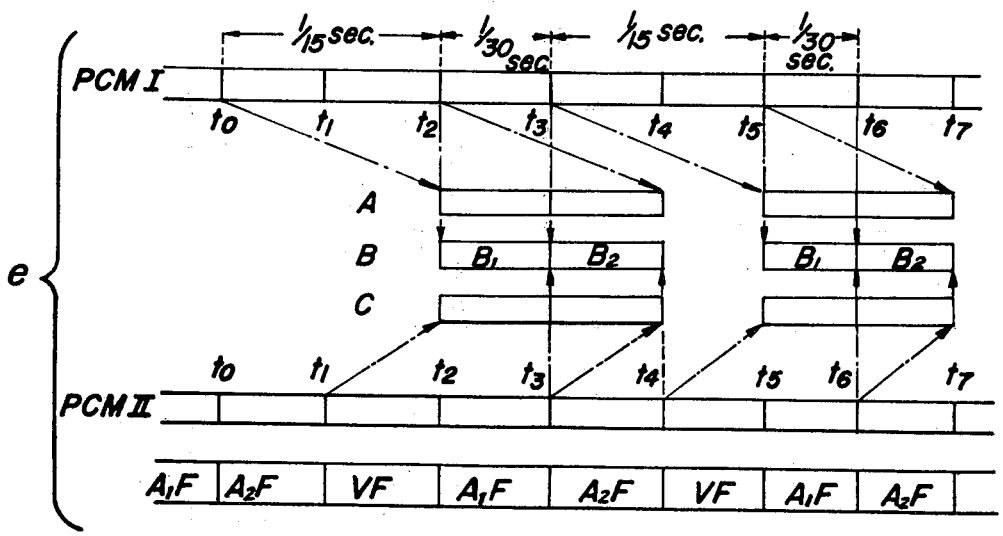
FIG_1

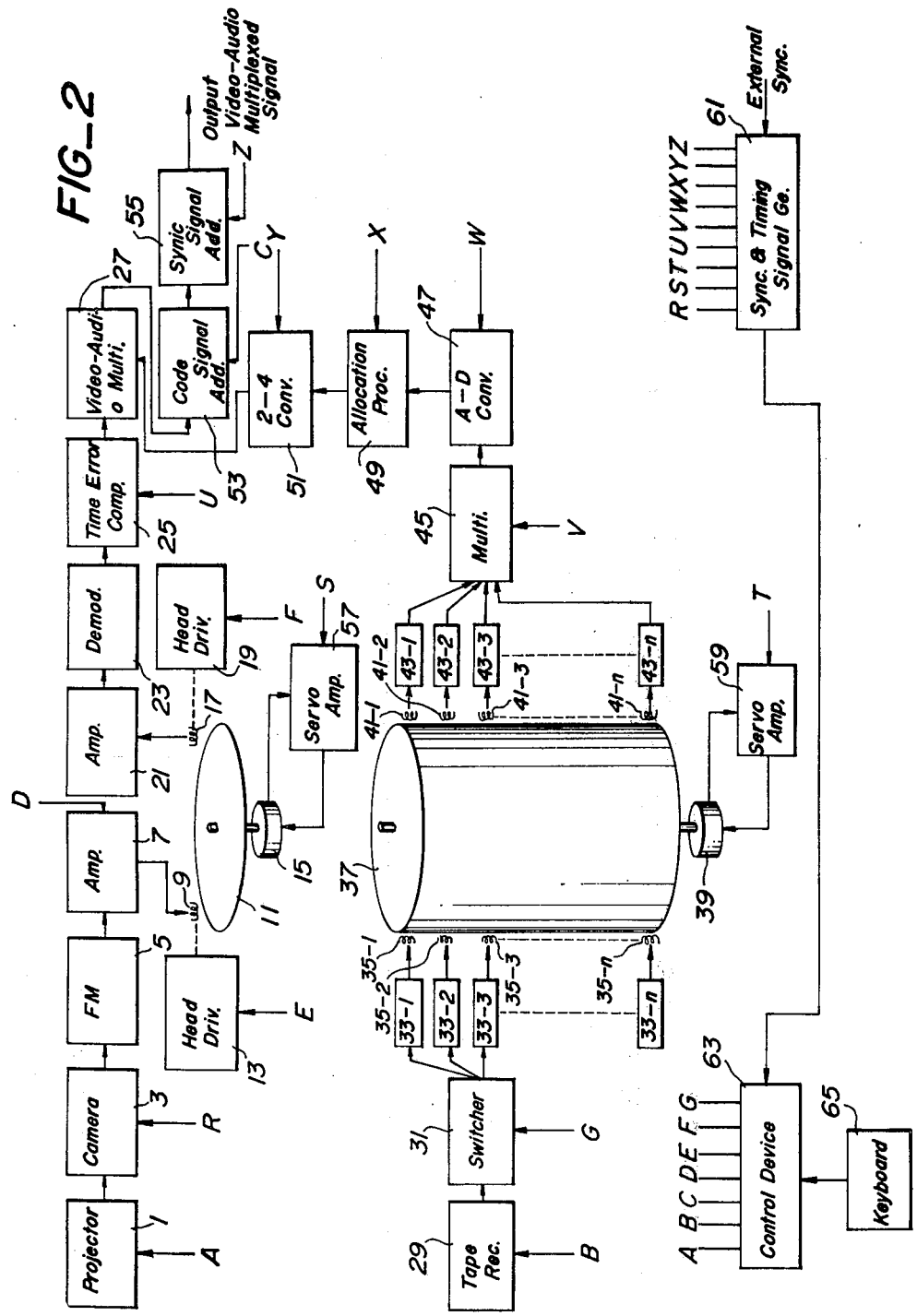

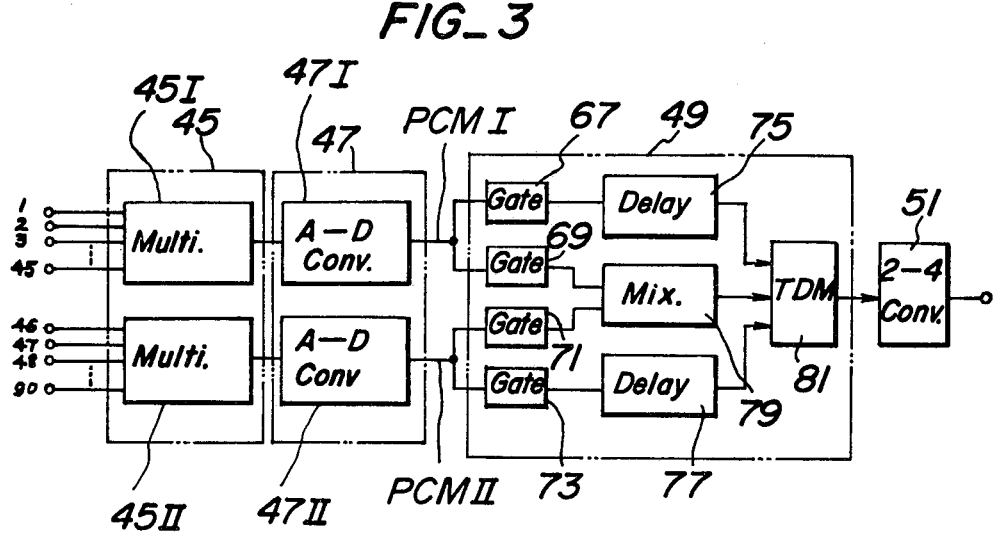
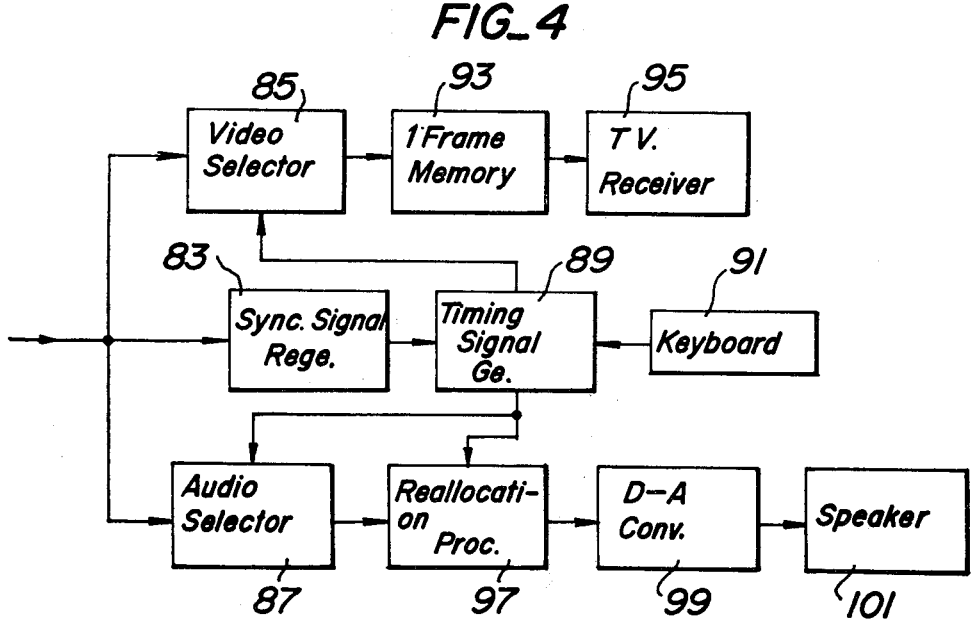

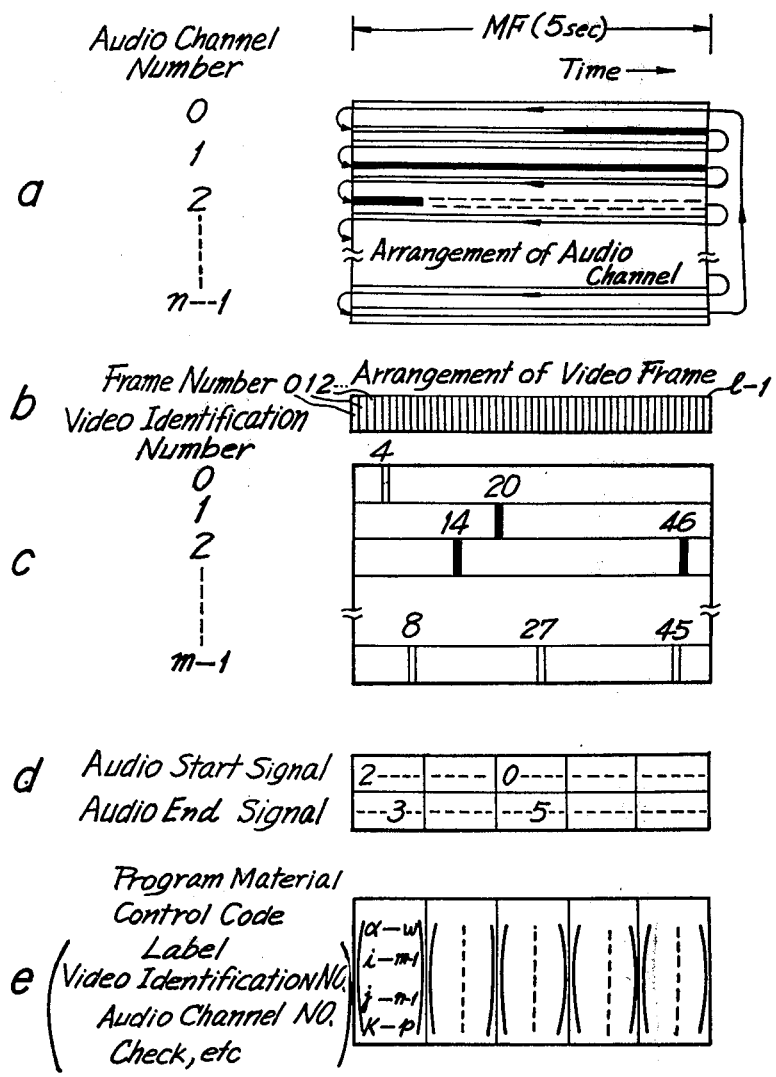

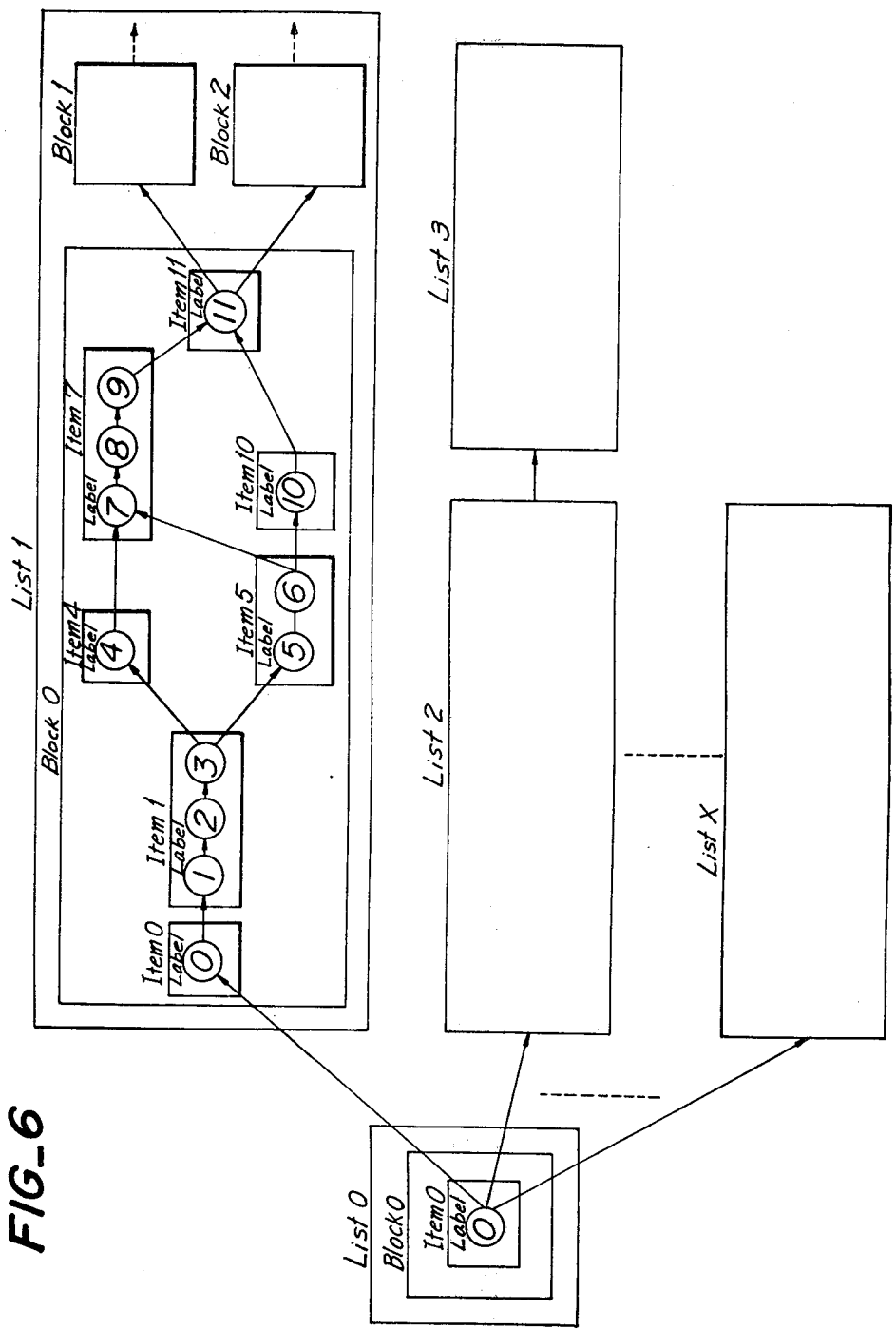
FIG_6

FIG_7
a.
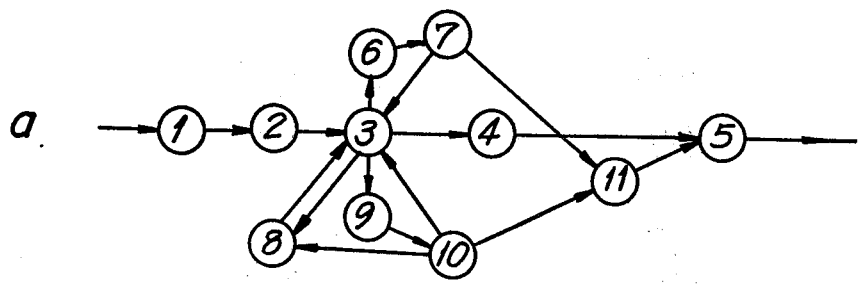
b.
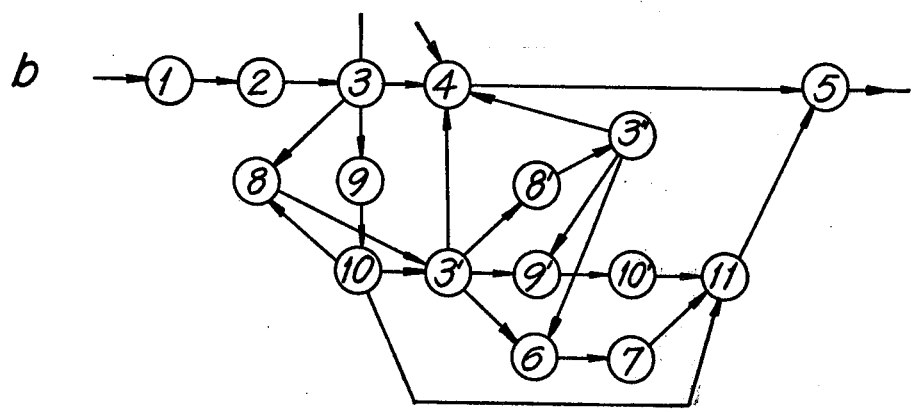

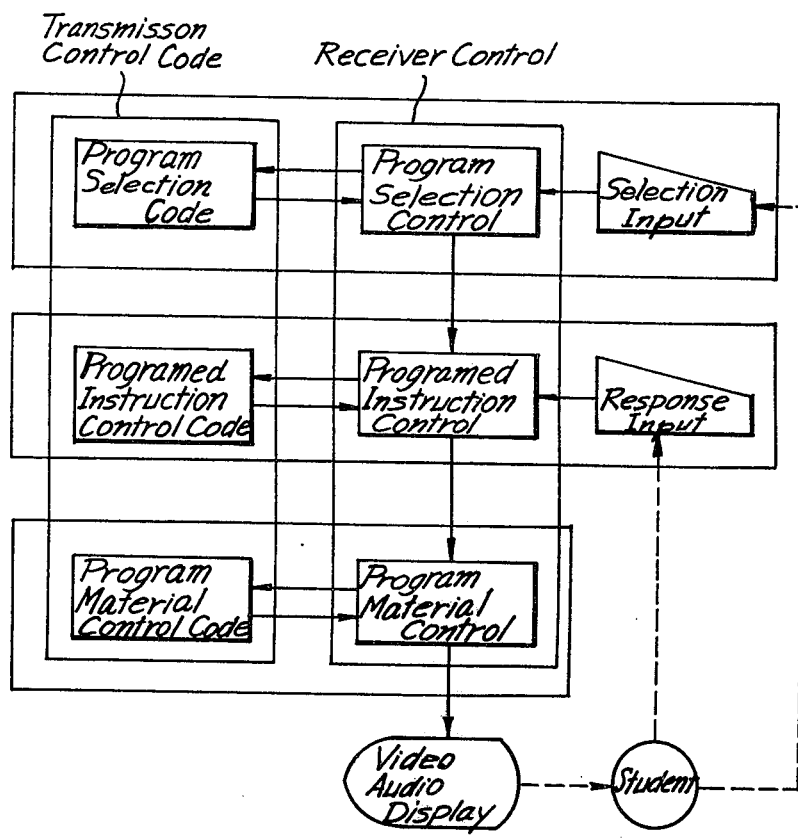

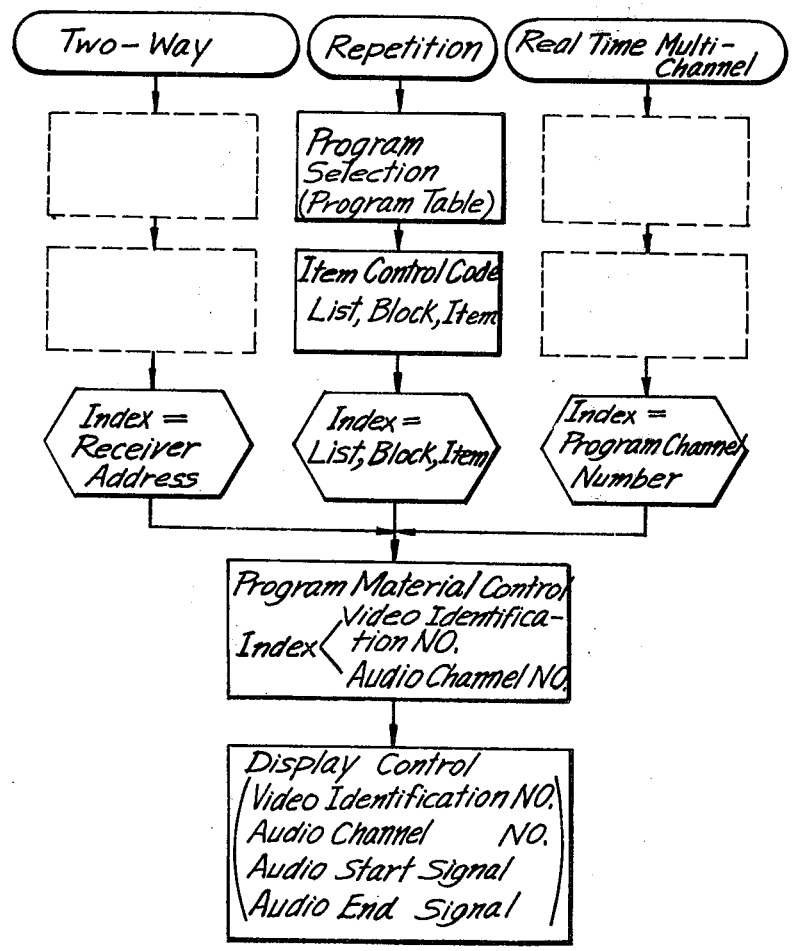

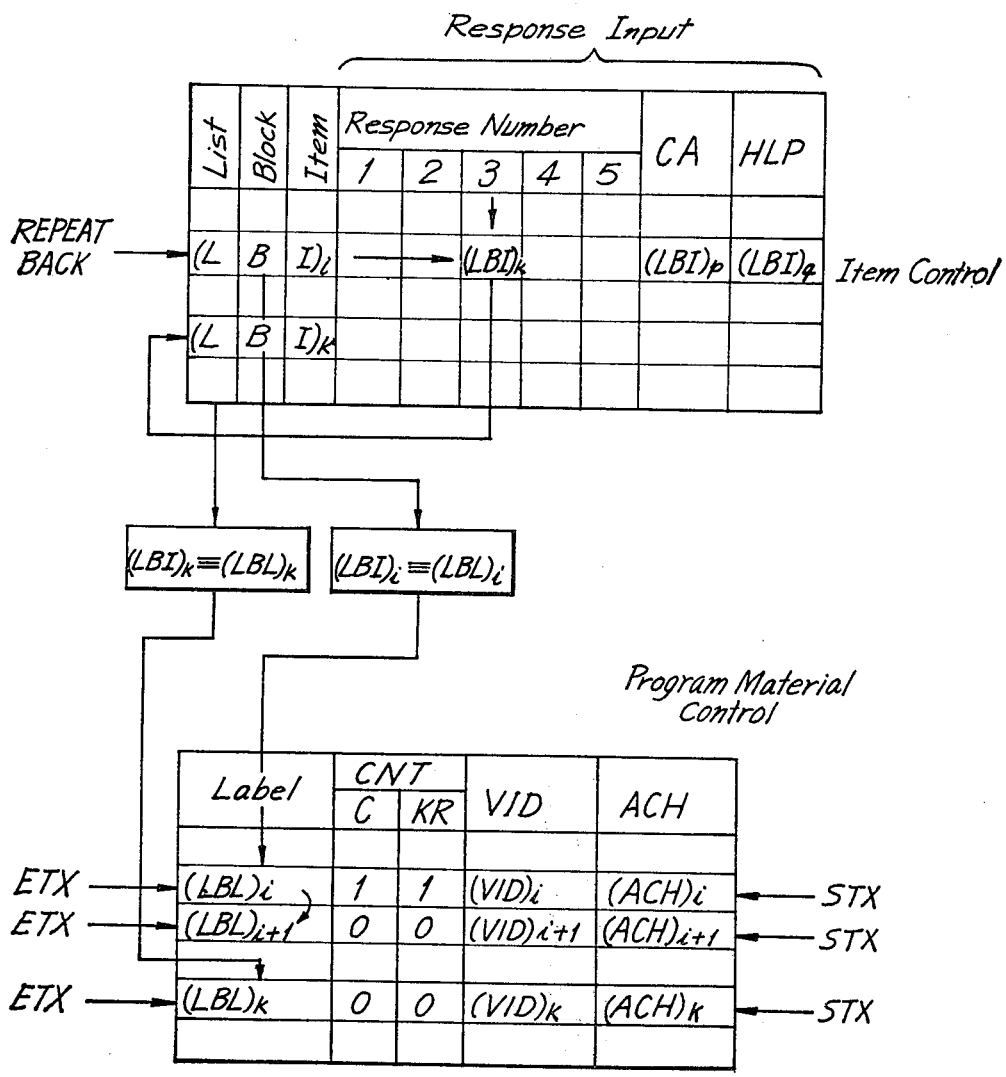

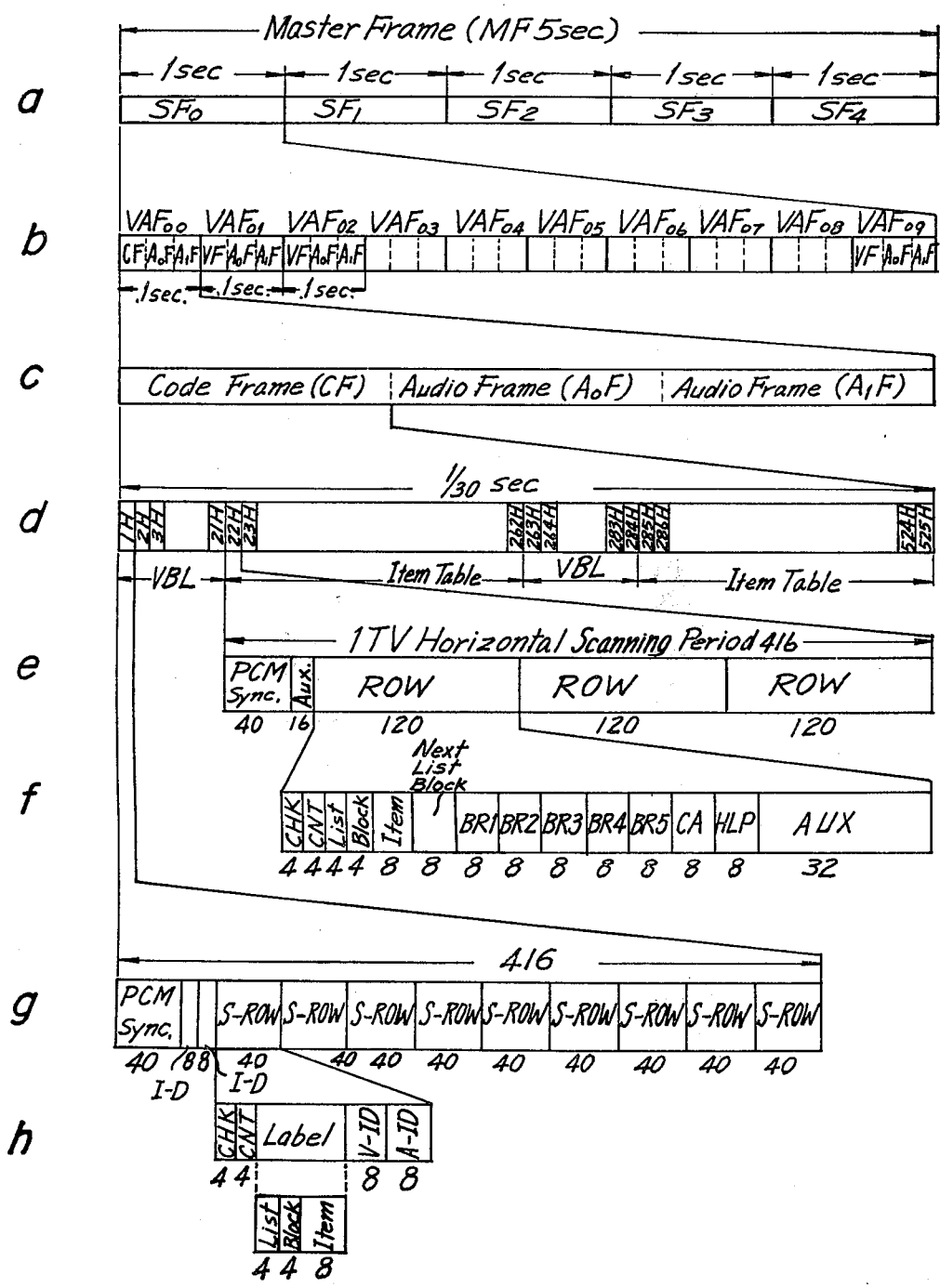

FIG_12 a  Item Control Code

| CHK | CNT | LBI | | Next | Item | | | | | CA | HLP | AUX |
|---|---|---|---|---|---|---|---|---|---|---|---|---|
| | | List | Block Item | NBL | BR₁ | BR₂ | BR₃ | BR₄ | BR₅ | | | |
| Check | Progress Control | List | Block Item | Next List and Block | Branch 1 | Branch 2 | Branch 3 | Branch 4 | Branch 5 | Correct Answer | Hint | Auxiliary |
| 4 | 4 | 4 | 8 | 8 | 8 | 8 | 8 | 8 | 8 | 8 | 8 | 32 |

1466 Rows b  Program Material Control Code

| CHK | CNT | LBL | V-IDA-CH |
|---|---|---|---|
| 4 | 4 | 16 | 8 | 8 |

4050 Rows

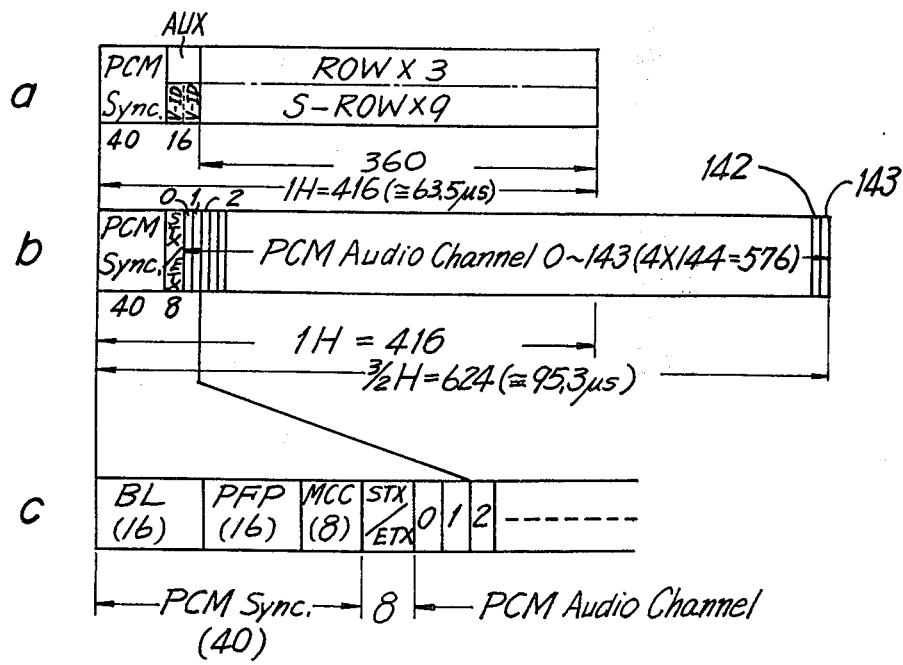
FIG_13

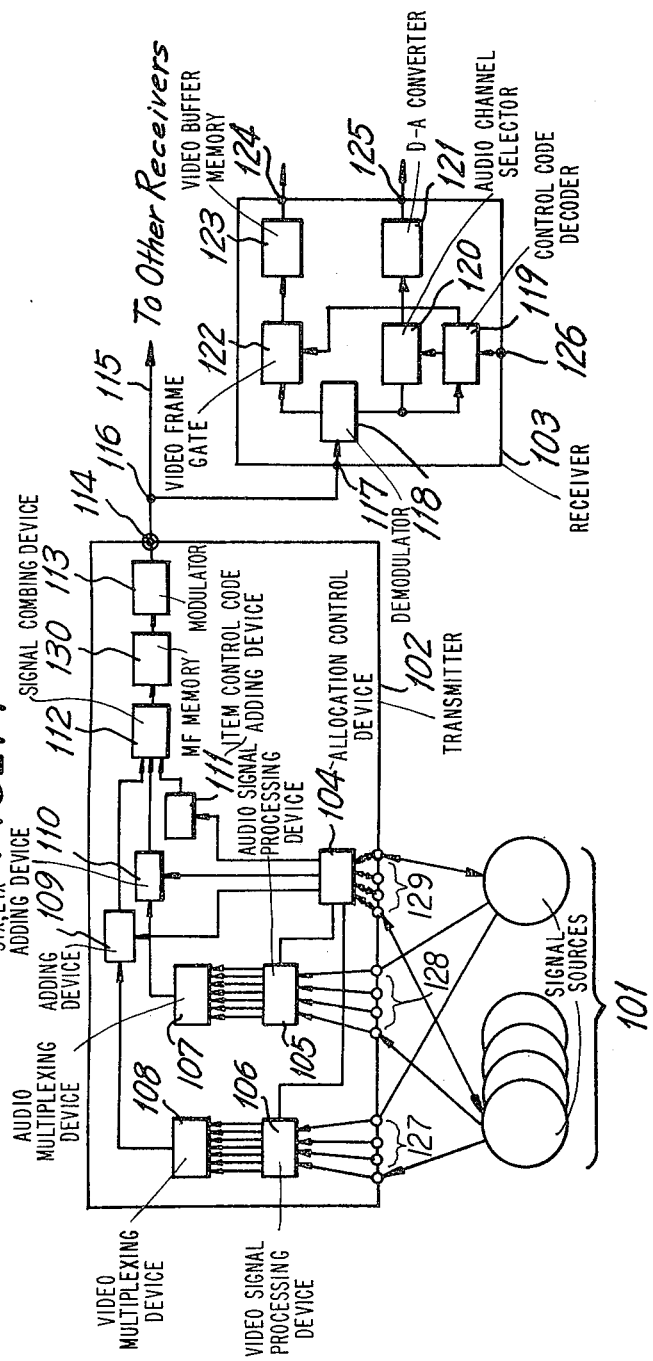

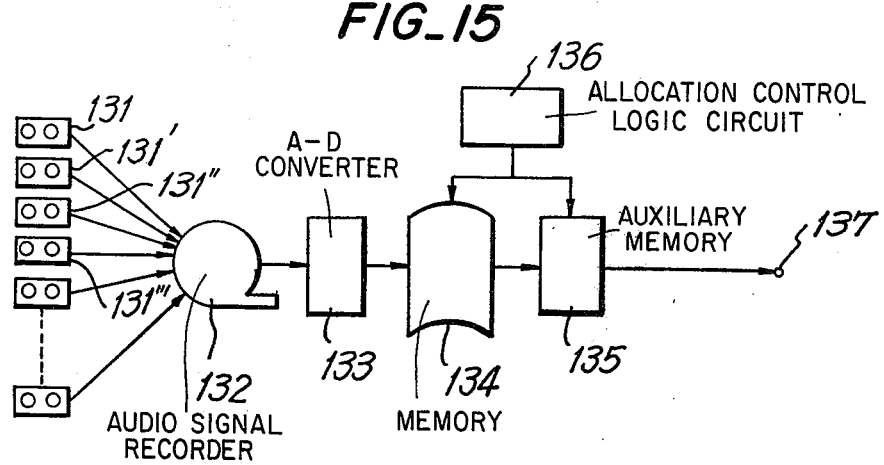

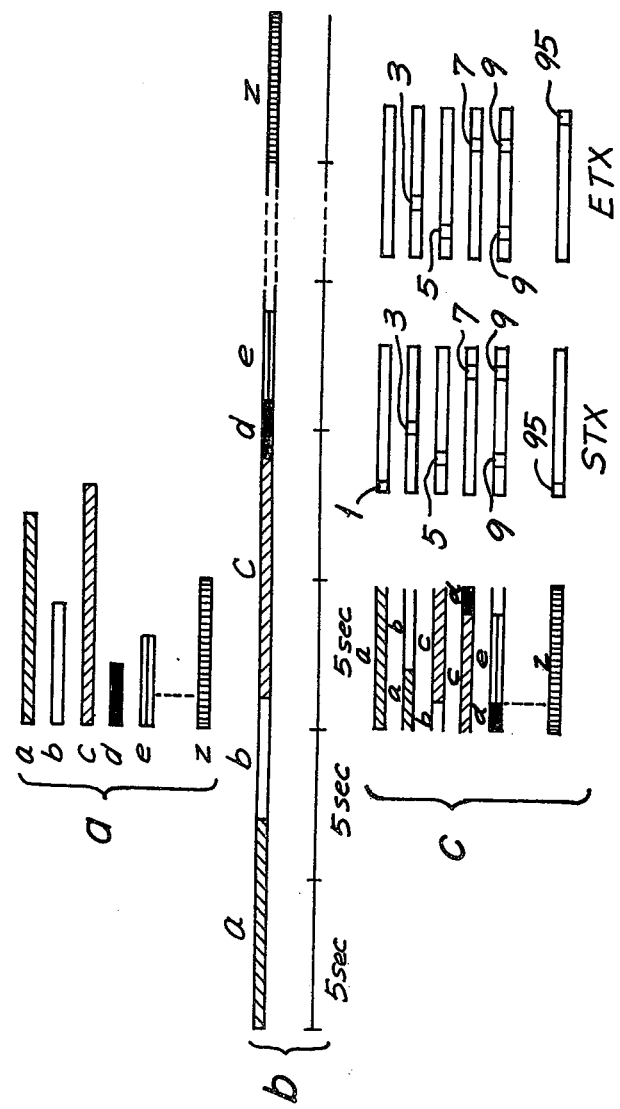

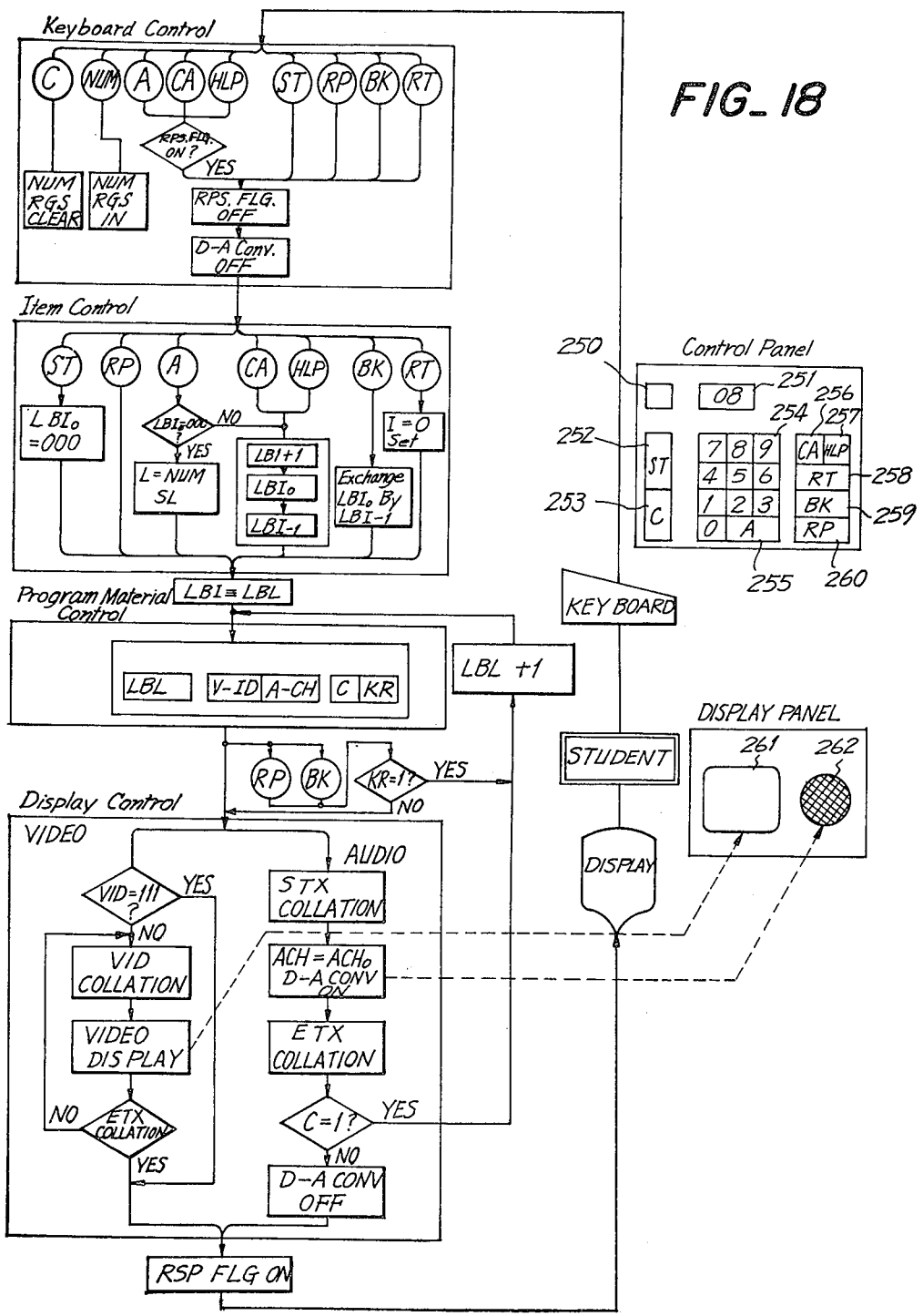
FIG_18

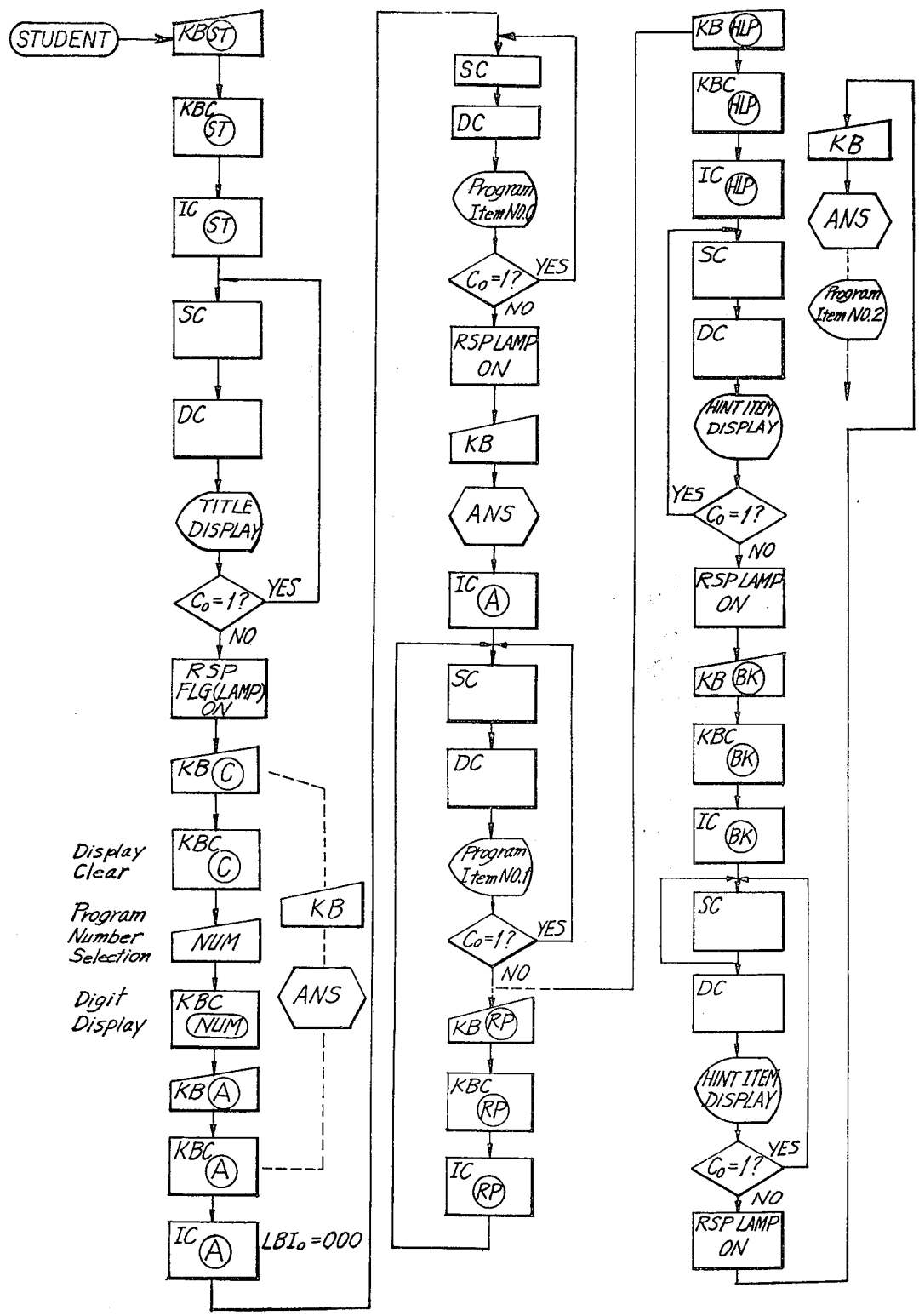
FIG_19

SIGNAL TRANSMISSION SYSTEM FOR TRANSMITTING PROGRAMED INFORMATION SUCH AS PROGRAMED INSTRUCTION

This invention generally relates to a signal transmission system for transmitting various kinds of information signals and more particularly relates to a programed information transmission system wherein a number of different program materials and control signals for controlling the progress and combinations of the transmitted program materials are simultaneously transmitted and in which programed information is constructed from a series of the transmitted program materials at a receiver end on the basis of the transmitted control signals.

In a signal multiplexing transmission system, for example in a still picture transmission system, a plurality of information signals divided alternately into given different time periods having an arbitrary integer ratio are repeatedly transmitted at a given time period.

Before the present invention is explained, the still picture transmission system will be firstly described. In this system the signals divided into given time periods are television picture signals of a plurality of still pictures and audio signals in the form of PCM signals related to the still pictures and these signals are transmitted alternately.

The present inventors have developed a time division multiplexing transmission system for transmitting video signals of a plurality of still pictures and pulse code modulated (PCM) audio signals related thereto by turns at a time rate of, for example, 1 to 2 television frames.

Now a basic construction of such a transmitting system will be explained with reference to FIGS. 1 to 4. FIG. 1 shows a format of the video-audio multiplexed signal to be transmitted. FIG. 1a denotes a program of 5 seconds. This program is termed as a master frame MF. The master frame MF consists of 5 sub-frames SF, each of which has a duration of 1 second. As shown in FIG. 1b, each sub-frame SF consists of ten video-audio frames VAF and each video-audio frame VAF has a duration of 1/10 seconds. As illustrated in FIG. 1c, each video-audio frame VAF further consists of a video frame VF of one television frame period (1/30 seconds) and an audio frame AF of two television frame period (1/15 seconds). Each audio frame AF further consists of a first audio frame $A_1F$ and a second audio frame $A_2F$, each having one television frame period (1/30 seconds). Thus the master frame MF is composed of 150 television frames.

By constructing the master frame MF as mentioned above, in the master frame MF, there may be inserted 50 still pictures. However, in fact, it is necessary to transmit code signals for identifying still pictures and their related sounds and for indicating timings of starts and ends of various signals. It is advantageous to transmit such code signals in the video frames VF rather than in the audio frames AF. In the present embodiment, code signals are transmitted in a video frame VF of each sub-frame SF. A frame during which the code signals are transmitted is referred as a code frame CF. FIG. 1d shows a part of the sub-frame SF which includes such a code frame CF. Therefore, in the master frame MF, there are inserted forty five still pictures and thus it is required to transmit 45 sounds related thereto, i.e. 45 channels of audio signals.

Sound like speech or music needs several seconds or more to give some meaning, because sound is inherently continuous. In the present embodiment the maximum duration of each sound relating to each still picture is limited to 10 seconds. As mentioned above the master frame MF has a duration of only 5 seconds, so that in order to transmit sounds of 10 seconds it is necessary to use the number of channels twice the number of sound channels. That is in order to transmit sounds of 45 channels relating to 45 still pictures, it is required to establish 90 audio channels. Moreover, it is impossible to transmit audio signals in the video frames VF. Therefore, PCM audio signals must be divided and allocated in the audio frames AF only. In order to effect such an allocation treatment for audio signals, the PCM audio signals of 90 channels are divided into two groups PCMI and PCMII as shown in FIG. 1e. Portions of PCMI corresponding to the second audio frames $A_2F$ and the video frames VF are delayed for two television frame periods of 1/15 seconds and portions of PCMII corresponding to the video frames VF and the first audio frames $A_1F$ are delayed for one television frame period of 1/30 seconds. PCM signals thus delayed form audio channels A and C as illustrated in FIG. 1e. Portions of PCMI and PCMII which correspond to the first audio frames $A_1F$ and the second audio frames $A_2F$, respectively are directly inserted in audio channels $B_1$ and $B_2$ to form an audio channel B. In this manner in the audio channels A, B and C, there are formed vacant frames corresponding to the video frames VF. By effecting such an allocation for the audio signals, in each audio frame AF it is necessary to establish a number of audio channels which is 1½ times the number of the audio signal channels. In the present embodiment, 135 audio channels have to be provided in each audio frame AF. In this manner, audio signals of 135 channels are inserted in each audio frame AF in the form of PCM signals allocated in given time slots.

An embodiment of a transmitting apparatus for effecting the above mentioned still picture — PCM audio signal time division multiplexing transmission will now be explained with reference to FIG. 2. The transmitting apparatus comprises a video signal processing system and an audio signal processing system. The video signal processing system comprises a random access slide projector 1, on which is loaded slides of still pictures to be transmitted. The projector 1 projects optically an image of a slide of a still picture onto a television camera 3. The camera 3 picks up the image and produces an electrical video signal. The video signal is supplied to a frequency-modulator 5 and a carrier is frequency-modulated by the video signal. The FM video signal is amplified by a recording amplifier 7 and an amplified video signal is supplied to a video recording head 9. This head 9 is an air-bearing type floating head and is arranged to face a surface of a magnetic disc memory 11. The head 9 is driven by a head driving mechanism 13 so as to move linearly in a radial direction above the surface of the disc memory 11. The disc memory 11 is preferably made of a plastic disc having coated a magnetic layer thereon. This kind of memory has been described in detail in an NHK Laboratories Note, Serial No. 148, "Plated magnetic disc using plastic base"; December 1971. The disc 11 is rotatably driven by a motor 15 at a rate of 30 rounds per second. There is further provided an air-bearing type floating head 17 for reproducing video signals recorded on the disc memory 11. The reproducing head 17 is also driven by a driving mechanism 19 so as to move linearly in a radial direction above the surface of the disc 11. The magnetic heads 9 and 17 are moved intermittently so that on the surface of the disc 11 there are formed many concentric circular tracks. On each track is recorded the video signal for one television frame period corresponding to each still picture. The reproduced video signal from the reproducing head 17 is supplied to a reproducing amplifier 21 and the amplified video signal is further supplied to a frequency-demodulator 23. The demodulated video signal from the frequency-demodulator 23 is supplied to a time-error compensator 25, in which time-errors of the demodulated video signal due to non-uniformity of rotation of the disc memory 11 can be compensated. The time-error compensator 25 may be a device which is sold from AMPEX Company under a trade name of "AMTEC". The time-error compensated video signal is supplied to a video input terminal of a video-audio multiplexer 27.

The audio signal processing system comprises an audio tape recorder 29 of the remote controlled type. On this tape recorder 29 is loaded a tape on which many kinds of audio signals related to the 45 still pictures have been recorded. The reproduced audio signals from the tape recorder 29 are supplied to a switcher 31 which distributes each audio signal corresponding to each still picture to each pair of recording amplifiers 33-1, 33-2; 33-3, 33-4; . . . 33-n. The amplified audio signals from the amplifiers 33-1, 33-2, 33-3 . . . 33-n are supplied to audio recording heads 35-1, 35-2, 35-3 . . . 35-n, respectively. There is provided an audio signal recording magnetic drum 37 which is rotated by a driving motor 39 at a rate of one revolution for 5 seconds. As already described above each sound corresponding to each still picture lasts at the longest for 10 seconds, so that each audio signal of each sound is recorded on two tracks of the magnetic drum 37 by means of each pair of audio recording heads 35-1, 35-2, 35-3, 35-4; . . . 35-n. That is a first half of a first audio signal for 5 seconds is recorded on a first track of the drum 37 by means of the first recording head 35-1 and then a second half of the first audio signal is recorded on a second track by means of the second head 35-2. In this manner, the successive audio signals corresponding to the successive still pictures are recorded on the magnetic drum 37.

The audio signals recorded on the drum 37 are simultaneously reproduced by audio reproducing heads 41-1, 41-2, 41-3 . . . 41-n, the number of which corresponds to the number of the audio recording heads 35-1, 35-2, . . . 35-n. In the present embodiment n=90. The reproduced audio signals are amplified by reproducing amplifiers 43-1, 43-2, 43-3 . . . 43-n. The amplified audio signals are supplied in parallel to a multiplexer 45 in which the audio signals are multiplexed in time division mode to form a time division multiplexed (TDM) audio signal. The TDM audio signal is then supplied to an A-D converter 47 to form a PCM-TDM audio signal. In this case a sampling frequency of the audio signal is selected to be 10.5 KHz. This PCM audio signal is further supplied to an audio allocation processor 49 in which the PCM audio signal is allocated in the audio frames AF as explained above with reference to FIG. 1e. The detailed construction and operation of the audio allocation processor 47 will be explained later. The PCM audio signal supplied from the processor 49 is a two-level PCM signal. This two-level PCM signal is converted in a two-four level converter 51 into a four-level PCM signal. The four-level PCM audio signal is supplied to an audio signal input terminal of the video-audio multiplexer 27. In the multiplexer 27, the video signal from the time-error compensator 25 and the four-level PCM audio signal from the two-four level converter 51 are multiplexed in a time division mode. A multiplexed video-audio signal from the multiplexer 27 is supplied to a code signal adder 53 which adds to the multiplexed video-audio signal the code signal for selecting desired still pictures and their related sounds at a receiver end to form the signal chain shown in FIG. 1d. The signal chain from the code signal adder 53 is further supplied to a synchronizing signal adder 55 in which a digital synchronizing signal is added to form an output video-audio signal to be transmitted.

In the transmitting apparatus shown in FIG. 2, there are further provided servo amplifiers 57 and 59 so as to maintain the rotation of the video disc memory 11 and the audio magnetic drum 37 constant.

In order to transmit the output video-audio signal as a television signal, it is necessary to synchronize the operation of the various portions of the transmitting apparatus with an external synchronizing signal. To this end, there is further provided a synchronizing and timing signal generator 61 which receives the external synchronizing signal and generates synchronizing and timing signals R, S, T, U, V, W, X, Y and Z for the camera 3, the servo amplifiers 57 and 59, the time-error compensator 25, the audio multiplexer 45m the A-D converter 47, the audio allocation processor 49, the two-four level converter 51 and the synchronizing signal adder 55, respectively. The generator 61 further supplies synchronizing and timing signals to a control device 63 which controls selection of still pictures and sounds, recording, reproducing and erasing of video and audio signals, generation of code signals, etc. The control device 63 further receives instruction signals from an instruction keyboard 65 and supplies control signals A, B, C, D, E, F and G to the projector 1, the audio tape recorder 29, the code signal adder 53, the video recording amplifier 7, the video recording head driving mechanism 13, the video reproducing head driving mechanism 19 and the switcher 31, respectively.

FIG. 3 shows a detailed construction of the audio allocation processor 49. In FIG. 3, there are also shown the multiplexer 45, the A-D converter 47 and the two-four level converter 51. When independent audio signals of 90 channels are to be transmitted, they are divided into two groups each including 45 channels. These audio signals are supplied to a pair of multiplexers 45I and 45II and a pair of A-D converters 47I and 47II, respectively, to form a pair of PCM time division multiplexing signals PCMI and PCMII as shown in FIG. 1e.

The audio allocation processor 49 comprises gates 67, 69, 71 and 73. The signal PCMI is supplied to the gates 67 and 69 and the other signal PCMII is supplied to the gates 71 and 73. To the gate 67 is applied such a gate signal from the synchronizing and timing generator 61 shown in FIG. 2 that the gate 67 is opened for two frame periods $t_0$–$t_2$, $t_3$–$t_5$ . . . and closed for one frame period $t_2$–$t_3$, $t_5$–$t_6$ . . . in each three frame periods. To the gate 69 is applied a gate signal which has a reverse polarity to that of the gate signal supplied to the gate 67, so that the gate 69 is closed for two frame periods $t_0$–$t_2$, $t_3$–$t_5$ . . . and opened for one frame period $t_2$–$t_3$, $t_5$–$t_6$ . . . in each three frame periods. The gate 71 is opened for two frame periods $t_1$–$t_3$, $t_4$–$t_6$ . . . and closed for one frame period $t_0$–$t_1$, $t_3$–$t_4$ . . . in each three frame periods, but delayed for one frame period with respect to the gate 67. The gate 73 is closed for two frame periods $t_1$–$t_3$, $t_4$–$t_6$ . . . and opened for one frame period $t_0$–$t_1$, $t_3$–$t_4$ . . . in each three frame periods, but delayed for one frame period with respect to the gate 69. The construction and operation of these gates are well-known in the art, so that a detailed explanation thereof is not necessary. To an output of the gate 67 is connected a delay circuit 75 which delays input signals by two frame periods and to an output of the gate 73 is connected a delay circuit 77 which delays input signals by one frame period. A mixing circuit 79 is connected to both outputs of the gates 69 and 71. Output signals of the delay circuits 75 and 77 and the mixing circuit 79 are supplied to a time division multiplexing device 81 to form a time division multiplexed signal.

The signal PCMI is gated out by the gate 67 for a period $t_0$–$t_2$ and delayed by the delay circuit 75 for two frame periods to form the signal A shown in FIG. 1e. The other signal PCMII is gated out by the gate 73 for a period $t_1$–$t_3$ and delayed by the delay circuit 77 for one frame period to form the signal C shown in FIG. 1e. Moreover, a signal portion of the PCMI for a period $t_2$–$t_3$ is gated out by the gate 69 to form the signal $B_1$ shown in FIG. 1e and a signal portion of the PCMII for a period $t_3$–$t_4$ is gated out by the gate 71 to form the signal $B_2$ also shown in FIG. 1e. The signals $B_1$ and $B_2$ are mixed in the mixing circuit 79 and transferred to the time division multiplexing device 81 as a third channel signal B.

To the time division multiplexing device 81 are also supplied the first and second audio channels A and C to form the PCM-TDM audio signal which is further supplied to the two-four level converter 51.

In the manner mentioned above, it is possible to form a vacant frame for a period $t_1$–$t_2$ and the video signal can be transmitted in such a vacant frame.

In the transmitting apparatus mentioned above, the random access slide projector 1 is controlled by the control device 63 to project successive 45 still pictures and the video recording head 9 is driven by the mechanism 13 so as to face tracks of the disc memory 11. In this case, the video recording head 7 moves in one direction to face 23 alternate tracks so as to record 23 still pictures and then moves in an opposite direction to face the remaining 22 tracks which are situated between the tracks on which the video signals of the first twenty three still pictures have been recorded. The video recording amplifier 7 receives a gate signal D of 1/30 seconds from the control device 63 and supplies a recording current to the video recording head 9 for said period. The motor 15 for driving the disc 11 is controlled by the servo amplifier 57 to rotate at a constant angular velocity of 30 rps. The servo amplifier 57 detects the rotation of the disc 11 and controls the motor 15 in such a manner that the detected signal coincides with the timing signal S supplied from the generator 61. The video reproducing head 17 is driven by the mechanism 19 in the same manner as the video recording head 9. The reproducing head 17 is moved in the audio frame and code frame periods and is stopped in the video frame period to reproduce the video signal in a correct manner. The reproducing head 17 repeatedly reproduces the video signal of 45 still pictures.

As already explained, the audio signal of each sound relating to each still picture is recorded on two tracks of the magnetic drum 37. This drum 37 is driven by the motor 39 and this motor 39 is controlled by the servo amplifier 59. The servo amplifier 59 detects the rotation of the drum 37 and controls the motor 39 in such a manner that the detected signal coincides with the timing signal T supplied from the generator 61.

It is possible to revise a portion of the previosuly recorded pictures or sounds to new pictures or sounds while reproducing the remaining pictures and sounds. For picture information, the video recording head 9 is accessed to a given track by the head driving mechanism 13 and a new picture is projected by the random access slide projector 1 and picked up by the television camera 3. The video signal thus picked up is supplied to the frequency-modulator 5 and then to the recording amplifier 7. Before recording, a d.c. current is passed through the video recording head 9 and the previously recorded video signal is erased. Then the new video signal is recorded on the erased track of the disc 11. For sound information, a new sound is reproduced by the audio tape recorder 29 and a given track of the magnetic drum 37 is selected by the switcher 31. Before recording, the selected track is erased by an erasing head (not shown) corresponding to the selected recording head. These operations are controlled by the control signals supplied from the control device 63 on the basis of the instruction from the instruction keyboard 65 and the timing signals from the generator 61.

Next, a basic construction of a receiver will be explained with reference to FIG. 4. A received signal is supplied in parallel to a synchronizing signal regenerator 83, a video selector 85 and an audio selector 87. In the synchronizing signal regenerator 83, a synchronizing signal is regenerated from the received signal. The synchronizing signal thus regenerated is supplied to a timing signal generator 89. To the timing signal generator 89 is also connected to an instruction keyboard 91. The timing signal generator 89 produces timing signals to the video selector 85 and the audio selector 87 on the basis of the synchronizing signal from the regenerator 83 and the instruction from the keyboard 91. The video selector 85 selects a desired video signal and the audio selector 87 selects a desired audio signal related to the desired video signal. The selected video signal of the desired still picture is once stored in a one frame memory 93. The video signal of one frame period is repeatedly read out to form a continuous television video signal. This television video signal is displayed on a television receiver 95.

The above described still picture-sound transmission system is quite suitable to transmit programed instruction for education. The programed instruction has a complicated construction. As is well known in the programed instruction field, the programed instruction is divided into a number of program materials. These program materials are transmitted from a single transmitter (teacher) to a plurality of receivers (students). If the transmission is effected by television broadcasting, the transmission system is of a one-way system, whereas according to the principle of the programed instruction the students should answer a question and progress of the program materials should be determined in accordance with the answers of the students. Such a programed instruction requires essentially a two-way transmission system.

The present invention has for its object to provide a novel programed information transmission system in which at a transmitter end a number of program materials consisting of a programed information and control information for controlling progress of the programed information are transmitted and at a receiver end a series of the program materials are selectively extracted under the control of the control information so as to reproduce a given programed information.

It is another object of the invention to provide a transmission system which uses a control system common to various types of transmission systems such as a one-way transmission system and a two-way transmission system.

It is still another object of the invention to provide a transmission system which is particularly suitable for transmitting programed instruction for education.

According to the invention, a signal transmission system for transmitting programed information comprises at a transmitter end
a program material source for producing a plurality of program materials;
means for producing a control signal which is used at a receiver end to control a manner of sequentially connecting program materials to construct at least one significant program, said program materials and control signal constituting said programed information; and
means for transmitting said programed information composed of said program materials and control signal;
and at a receiver end means for receiving said transmitted program information;
means for detecting said control signal from said programed information;
means for extracting desired program materials in a desired sequence from the program materials in said programed information with the aid of said detected control signal; and
means for displaying said extracted program materials.

Now the present invention will be explained in detail with reference to the accompanied drawings in which:

FIGS. 1a, 1b and 1c show constructions of a master frame, a sub-frame and a video-audio frame of video and audio signals transmitted by a time division multiplexing transmission system, FIG. 1d illustrates a portion of said signal which includes a control frame and FIG. 1e shows a manner of effecting an audio PCM signal allocation;

FIG. 2 illustrates diagrammatically a basic construction of a transmitter for the still picture-sound transmission system;

FIG. 3 is a block diagram showing a detailed construction of an audio allocation processor shown in FIG. 2;

FIG. 4 is a block diagram showing a principal construction of a receiver of the still picture-sound transmission system;

FIGS. 5a, 5b, 5c, 5d and 5e illustrate diagrammatically constructions of an audio channel, a video frame, a video channel, audio start and end signals and a program material control code, respectively, used in the transmission system according to the invention;

FIG. 6 shows a construction of the programed instruction which is composed of lists, blocks, items and labels;

FIGS. 7a and 7b show embodiments of item progress modes in the programed instruction;

Figure 17:
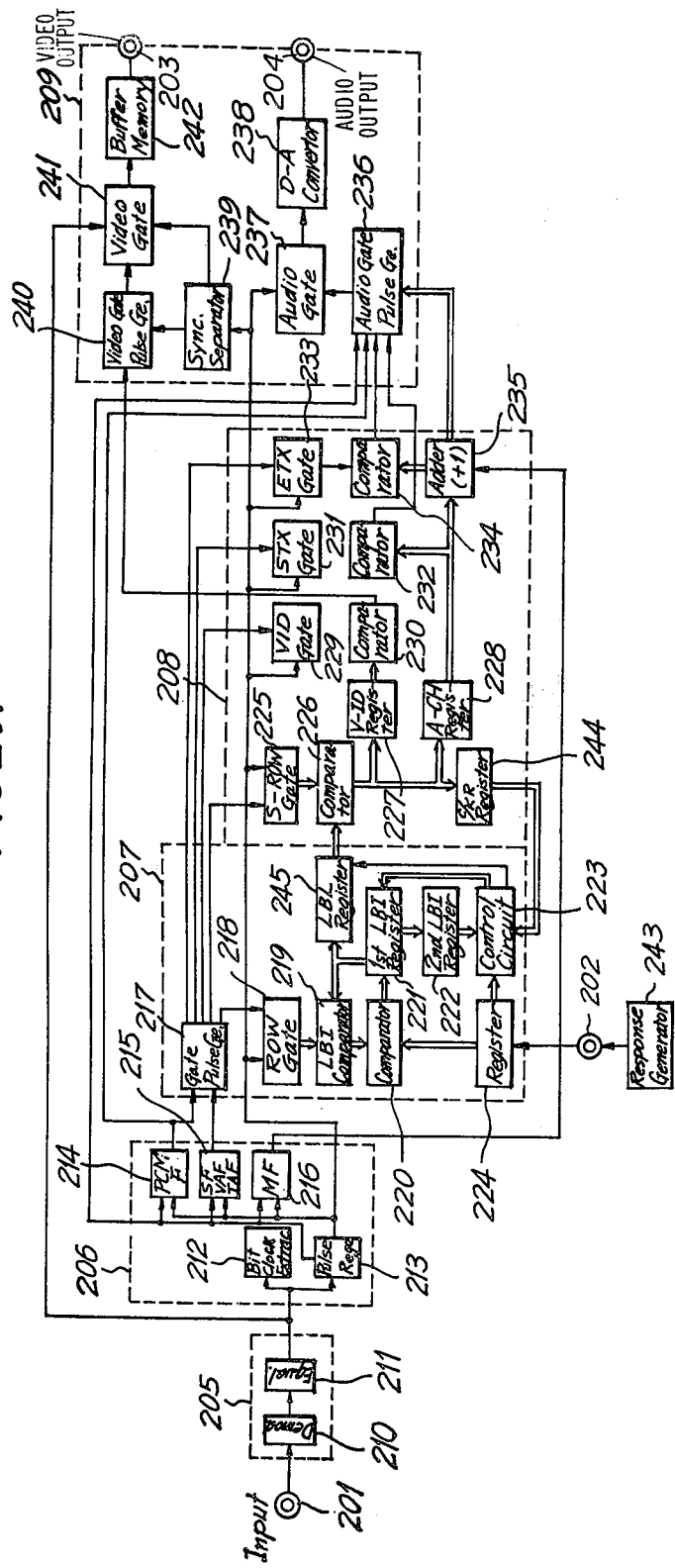

FIG. 8 diagrammatically shows a control for constructing the programed instruction at a receiver end;

FIG. 9 illustrates a control mode which may be commonly used for various transmission systems;

FIG. 10 is a flow chart of the control process at the receiver end according to the invention;

FIG. 11 shows an embodiment of signal formats of transmitted signals according to the invention;

FIG. 12a illustrates an embodiment of an item control code and FIG. 12b shows an embodiment of a program material control code according to the invention;

FIG. 13 shows a signal format for explaining timings of audio start and end signals and a PCM synchronizing signal;

FIG. 14 is a block diagram of a transmitter and a receiver of the transmission system according to the invention;

FIG. 15 is a block diagram showing an embodiment of the time division multiplexed audio signal forming apparatus;

FIGS. 16a, 16b and 16c show signal waveforms for explaining the operation of the apparatus shown in FIG. 15;

FIG. 17 is a detailed block diagram of the receiver according to the invention;

FIGS. 18 and 19 are flow charts for explaining the operation at the receiver according to the invention.

FIG. 5 shows signal constructions of the video and audio signals and control signals. As shown in FIGS. 5a and 5b, the still picture-sound signals are composed of audio signals of $n$ channels and the video signals of $l$ frames and are repeatedly transmitted at a period of a master frame MF, for example, 5 seconds. Each video signal has a video identification code or number VID added thereto and is allotted in each time slot $0$ to $l-1$ of the television frame period. As shown in FIG. 5c, there are $m$ kinds of the video identification numbers VID and in some cases, the same identification number VID is added to several still pictures. That is to say in FIG. 5c a still picture having the video identification number VID=0 added thereto is transmitted in a fourth video frame, but two different still pictures having the same video identification number VID=2 are transmitted in 14th and 46th video frames. In this manner, the still pictures having the video identification numbers VID=0 to VID=$m-1$ are transmitted in the video frames 0 to $l-1$ and in this case in a single frame only one still picture is transmitted and two or more still pictures are not transmitted in one frame in a superimposed manner.

When an audio signal having a time length longer than the master frame period is to be transmitted, the audio signal is folded back at the end of the master frame MF and is continued to the head of a next channel. The audio signal folded at the end of the last audio channel $n-1$ continues to the first audio channel 0. Thus, the audio channels constitute a loop. The transitions of the audio signals are controlled by audio start signals (STX) and audio end signals (ETX) which are also transmitted as shown in FIG. 5d. These audio start and end signals are channel numbers in which the audio signals start and come to ends, respectively.

In order to denote given still picture and sound materials by means of the video identification numbers and the audio channel numbers for constructing a certain broadcasting program or a programed instruction, program material control codes are formed and transmitted through the same transmission path as that for transmitting the still picture-sound signals.

In case of using the signal transmission system according to the invention for transmitting a programed instruction, several programs are simultaneously transmitted and each student can select any one of them. In the embodiment shown in FIG. 6, five programs are simultaneously transmitted. As shown in FIG. 6, each program is divided into one or more lists and each list is composed of one or more blocks. Each block is divided into a number of items and each item is constructed by one or more labels. According to the invention program materials such as still picture video signals and audio signals may be commonly used for various labels and thus the quantity of program materials to be transmitted can be saved. Such construction of the program may be compared with that of a text book in such a manner that the list corresponds to a chapter or verse of the text book and the block corresponds to a section or part. The item corresponds to a paragraph and the label corresponds to a sentence. As shown in FIG. 6, the items and labels are denoted by a common sequential number system and the item number is the same as the label number of the first label in the related item. Thus, when an item is composed of a single label, the item and label are denoted by the same number.

Each of the lists, blocks and items has branches as shown in FIG. 6. For instance, the branch construction of the items is shown in FIG. 7. As shown in FIG. 7a, the items ①,②,④ proceed one by one, but the items ⑦ and ⑩ have a plurality of output branches and the items ⑧ and ⑪ have a plurality of input branches. Moreover, the item ③ has a plurality of input and output branches. Also as shown in FIG. 7a, some items, e.g., the items ③,⑥ and ⑦ constitute a loop. In such a case, it is rather difficult to produce the programed instruction by a simple receiver. For example, when a student enters the item loop, it might sometimes happen that he could not escape from the item loop. In order to avoid such a situation, it is necessary to provide means for forcedly proceeding the items at the receiver, so that the construction of the receiver becomes complicated. In order to obviate such disadvantages, it is preferable to rearrange the items as shown in FIG. 7b. In this case, the items do not constitute a loop, so that the construction and control of the receiver becomes much simpler.

Various controls at the receiver end for constructing the programed instruction may be diagrammatically illustrated in FIG. 8. According to an embodiment of the present invention, when a student switches on a start button provided on a control panel of the receiver unit, titles of the instruction programs are displayed on a display device at the receiver. The displayed titles indicate briefly the contents of the instruction programs which are simultaneously transmitted in a time division mode. This process is effected at a list 0 shown in FIG. 6. The student looks at the display and sets a selection code of a given instruction program. Then the given instruction program is selected. The above instruction program selecting operation may be effected in a different way. For example, the student may set directly the list, block and item numbers of a desired instruction program with reference to a program table which has been previously distributed to the student.

At a next step, an item control is carried out. This control is to denote a next following item. When the items ①,②,④,⑦,⑧, etc., shown in FIG. 7b have been displayed, the next items are exclusively determined, but the items ③,③',③'',⑩, etc., in FIG. 7b have more than one output branch and these branches must be selected by answer inputs of the student. In order to denote the next following items, item control codes are transmitted. Since the studying speeds of the students are different from each student, the item control codes must be transmitted always during the transmission of the programed instruction.

When the item is determined, then it is necessary to select program materials. That is to say, it is required to determine which still picture and sound materials are used among many still pictures and sound materials. For this purpose, it is necessary to transmit program material control codes by means of which desired video and audio signals are extracted at the receiver end. The student comprehends a question with the aid of the reproduced still pictures and sounds and provides an answer input by operating selection buttons provided on the control panel. At the receiver a next item is denoted by the answer of the student with reference to the transmitted control code. The above processes are repeated sequentially so as to perform the successive steps of the programed instruction.

As explained in the preamble essentially the programed instruction needs a two-way transmission path for providing questions from the transmitter to the student and giving answers from the receiver to the transmitter. But in the present embodiment use is made of a one-way broadcasting, so that all signals are transmitted simultaneously in a time division mode and are repeated at a short period. The master frame MF shown in FIG. 5 corresponds to the repetition period.

In addition to the transmission system of the repetition type, there may be a multi-channel real time transmission system or a two-way type transmission system. It is quite convenient for the receivers to adopt the transmission control system which may be commonly used for the various types of transmission systems and then the efficiency of the transmission becomes increased. According to the invention use is made of a control system which can be commonly used for the above mentioned three types of transmission systems. As shown in FIG. 9, according to the invention the program material control and the signal display control are used as a common control system. In the repetition type transmission system the item control code is transmitted and the list, block and item numbers are used for this purpose. These list, block and item numbers are related to labels used in the program material control. In the two-way type transmission system the receiver's addresses are related to the labels. In the multi-channel real time transmission system the program channel numbers are related to the labels.

As already explained above with reference to FIG. 6 the label number of the first label is same as the item number of the related item. Thus in the program material control desired video identification numbers and audio channel numbers are selected on the basis of the item numbers and the label numbers and the desired video signals and audio signals are extracted.

FIG. 10 illustrates a flow chart for explaining the operation of the item control and the program material control of a programed instruction at the receiver end. The upper half of FIG. 10 shows the item control table and the lower half illustrates the program material control table or signal. The item control code comprises a list number, a block number and an item number as an index. This index is expressed as LBI for the sake of explanation. A program material control code comprises a list number, a block number and a label number as an index or label, which is represented as LBL. Now it is assumed that an item denoted by (LBI)$i$ is selected. As already mentioned above in connection with FIG. 6, (LBI)$i$ is the same as (LBL)$i$ of the first label in the related item and thus at the program material control the video identification number (VID)$i$ and the audio channel number (ACH)$i$ are determined with reference to the program material control table. The reproduction period of the audio signal is controlled by the audio start and end signals STX and ETX.

When the item is constructed by a plurality of labels, after a label has been displayed, a next label is automatically determined without any response of the student. To this end, the program material control code comprises a control code C which denotes whether or not the related label is automatically followed by a next label. In FIG. 10, the control code C of the program material control code relating to the label denoted by (LBL)$i$ is 1, so that this label is automatically followed by a next label (LBL)$i$+1. Thus the label (LBL)$i$+1 is selected and the video identification number (VID)$i$+1 and the audio channel number (ACH)$i$+1 are determined. When the display of the label (LBL)$i$+1 has been completed, the display of the item (LBI)$i$ has been finished, because the control code C of the label (LBL)$i$+1 is 0. Then a next item must be determined by a response of the student. For example, when the content of the label (LBL)$i$+1 is a question to the student, he must give an answer by operating the buttons on the control panel. In the embodiment shown in FIG. 10, it is assumed that the student gives an answer of the response No. 3. Then a next item (LBI)$k$ is determined with the aid of the item control table. The above operation of the program material control is carried out for the item (LBI)$k$, i.e., the label (LBL)$k$.

As additional functions there are provided a correct answer request and a hint request. When the student gives a response input CA related to the correct answer request during the item denoted by (LBI)$p$ being selected, a correct answer item denoted by (LBI)$p$ is detemined as a next item and the correct answer is displayed by the program material control. Similarly, when the student provides a response input related to the hint request, an item denoted by (LBI)$q$ is selected and a hint for helping the student to derive a correct answer is displayed by the program material control.

There are further provided a repeat function and a back function. When the student operates a repeat switch provided on the panel, the same item is selected again and when the student actuates a back switch on the panel an item which precedes by one item with respect to the related item is selected. That is to say, when the back switch is operated during the item (LBI)$k$ being related, the item (LBI)$i$ is determined as a next item. If an item is composed of a plurality of labels, one or more labels are not necessary to be displayed when the repeat or back operation is requested. For this purpose, the control code CNT of the program material control table is provided with a code KR. As shown in FIG. 10, when the control code KR of the label (LBL)$i$ is 1, this label (LBL)$i$ need not be displayed in the repeat or back operation and since the next label (LBL)$i$+1 has the control code KR=0, this label (LBL)$i$+1 is selectively displayed upon the repeat or back operation. For example, the label (LBL)$i$ is a "knowledge of return" such as the teacher's reply with respect to the student's answer, so that such a label need not be displayed in case of repeat or back operation.

The item and program material control codes for effecting the item and program material controls as in the manner shown in FIG. 10 are transmitted as transmission control codes together with the video and audio signals. An embodiment of the arrangement and transmission of the transmission control codes will be explained with reference to FIG. 11. FIG. 12$a$ shows the item control table composed of the item control codes and FIG. 12$b$ illustrates a program material control table consisting of the program material control codes.

As shown in the item control table of FIG. 12$a$, the item control code has an LBI code for denoting the list number by four bits, the block number by four bits and the item number by eight bits. The item control code further comprises a next list and block code and a next item code. As shown in FIG. 12$a$, there are five next items any one of which is selected in accordance with the student reply. As illustrated in FIG. 12$a$, each of the next items is expressed by eight bits and the next block and list are represented by four bits, respectively. The item control code further includes the program progress control code or signal CNT of four bits and check code of four bits. In addition, there are provided in the item control code a correct answer item CA of eight bits and a hint item HLP of eight bits, which items CA and HLP are selected by the student's request. During the studying, if the student wants to get a correct answer or a hint for deriving the correct answer, the student depresses a correct answer button or a hint button provided on the control panel of the receiver and then the correct answer or the hint is indicated. In the actual item control code there are further provided 32 auxiliary bits. Thus the item control code consists of 120 bits and constitutes a row of the item control table shown in FIG. 12$a$. The number of rows must be determined with consideration of the signal form shown in FIG. 11. In the present embodiment, there are provided 1446 rows. Thus, the total number of items shown in FIG. 6 is also 1446 and such a large amount of items is sufficient for establishing any information in the programed instruction, so that the transmission control of the programed instruction in the one-way transmission can be effected to the same extent as in the two-way transmission.

FIG. 12$b$ illustrates the program material control table consisting of the program material control codes. In the program material control code the LBI code of 16 bits is used as the label code LBL and the video identification number VID of eight bits and the audio channel number ACH of eight bits related to the label are included. The program material control code further comprises four check bits CHK and the label progress control code CNT consisting of C of two bits and KR of two bits. Thus, the program material control code is composed of 40 bits and is referred to as the S-ROW, because it constitutes each row of the program material control table. In the transmission system shown in FIG. 11, it is possible to transmit 4050 rows.

FIG. 11$a$ shows one master frame MF of the repetition type transmission signal. The master frame MF comprises all of signals shown in FIGS. 5$a$ to 5$e$ and is repeatedly transmitted. In the present embodiment, the master frame MF has the period of 5 seconds.

The master frame MF is composed of five sub-frames $SF_0$ to $SF_4$ each having a duration of one second. FIG. 11b illustrates the content of a single sub-frame $SF_0$. The subframe $SF_0$ is divided into ten video-audio frames $VAF_{00}$ to $VAF_{09}$. Each of the video-audio frames other than $VAF_{00}$ consists of a video frame VF of 1/30 seconds and an audio frame AF of 2/30 seconds. The video-audio frame $VAF_{00}$ is constructed by a code frame of 1/30 seconds and an audio frame AF of 2/30 seconds. Each of the audio frames AF is divided into a first audio frame $A_0F$ of 1/30 seconds and a second audio frame $A_1F$ of 1/30 seconds. The contents of the video and audio frames are the same as those shown in FIG. 1.

FIG. 11d shows the content of the code frame CF which has the same duration as that of the video frame, i.e., one television frame period of 1/30 seconds. Thus, the code frame CF is divided by the horizontal synchronizing period H into 525H. During 482 H period from 22H to 262H and from 285H to 525H, the item control codes are transmitted. In FIG. 11e, the content of 22H is depicted in an enlarged scale. As shown in FIG. 11e, the period H comprises 416 bits and includes three ROWs (120×3=360 bits), the PCM synchronizing signal of 40 bits and 16 auxiliary bits. In this embodiment, the bits in the period H corresponds to the bit clock frequency of the audio PCM signals. As shown in FIGS. 11e and 12a each ROW is constituted by 120 bits and in each period H, there are included three ROWs, so that the number of ROWs inserted in 482 H period is 1446. Since the code frame CF is provided in each sub-frame SF, the item control codes are repeated five times in each master frame MF. Therefore, the item control can be effected without interruption.

The program material control codes are transmitted in a portion from 1H to 9H of the vertical blanking period VBL of each code frame CF and each video frame VF. As shown in FIG. 11g, in each horizontal period H there are included nine S-ROWs. In each sub-frame SF, there are ten code and video frames and thus 90 H period can be used for transmitting the program material control codes S-ROW. As illustrated in FIG. 11h, each S-ROW is constructed by 40 bits and thus the number of bits of nine S-ROWs in each H period is 360. In each H period, the PCM synchronizing signal of 40 bits is allotted. The remaining 16 bits are used to transmit twice in succession the video identification signal VID of eight bits. The video identification number VID is inserted in 1H to 9H of each video frame VF for identifying the still picture which is transmitted in the related video frame VF. In this case, the video identification number VID is transmitted twice in each H period and thus is totally transmitted 18 times in 9H period, so that the identification error can be avoided to a great extent.

The audio channel number ACH is not transmitted with direct relation to the audio signal and is indirectly related to the audio signal in accordance with the sequence of the time division multiplexing. FIG. 13b illustrates the arrangement of time slots in one frame of the time division multiplexing signal during the audio frames $A_0F$ and $A_1F$. FIG. 13a illustrates the signals shown in FIGS. 11e and 11g in a superimposed manner. As shown in FIG. 13a, the horizontal period H of the video signal has 416 bit pulses, but the PCM frame shown in FIG. 13b comprises ½ times 416 pulses, i.e., 624 pulses. In each PCM frame, there are formed 144 PCM audio channels and since the audio signals are modulated into four-level PCM pulses, each channel consists of four quaternary digit pulses. Thus, the total number of pulses of the PCM channels is 576. In each PCM frame, there is further provided the PCM synchronizing signal of 40 bit pulses and the audio start signal STX of eight bit pulses or the audio end signal ETX of eight bit pulses.

As illustrated in FIG. 13b, the PCM audio channels 0, 1, 2 . . . 142, 143 are inserted immediately after the time slots for the audio start or end signal STX or ETX. These 144 PCM audio channels comprise 96 PCM audio signal channels as mentioned above with reference to FIG. 1. FIG. 13c shows the time slots for the PCM synchronizing signal and the audio start or end signal in an enlarged scale. The PCM synchronizing signal is composed of BL of 16 bits, PFP of 16 bits and MCC of eight bits. The audio start signal STX and the audio end signal ETX each consisting of eight bits express channel numbers of 96 audio signal channels. The audio start signal STX and the audio end signal ETX are distinguished from each other in such a manner that the audio start signal STX is inserted in the given time slot of the PCM frame in the first audio frame $A_0F$ and the audio end signal ETX is inserted in the given time slot of the PCM frame in the second audio frame $A_1F$.

By selectively extracting the audio signal transmitted through the audio signal channel denoted by the audio start signal STX immediately after the related audio start signal STX is transmitted, the audio signal channel selection and the audio reproduction can be effected. The audio signal channel selection denoted by the audio end signal ETX is stopped immediately after the related audio end signal ETX appears. In this case, if the audio signal is folded back at the end of the master frame MF, and STX number is not the same as the ETX number. The ETX number must be increased by one every time the audio signal is folded back.

Since each of the audio frames $A_0F$ and $A_1F$ comprises 350 PCM frames, 350 STX signals and 350 ETX signals are included in one video-audio frame VAF. Thus, by taking into account the number of the audio signal channels of 96, the audio start signal STX and the audio end signal ETX may be transmitted several times. Moreover, considering the appearance of the audio start and end signals in the single video-audio frame VAF of 0.1 seconds, the audio start and end signals may be transmitted several 10 times. This results in that the redundancy of the STX and ETX detection at the receiver end increases and thus an error in channel detection can be advantageously decreased.

FIG. 14 illustrates transmitting and receiving apparatuses for effecting the still picture-sound transmission system in which the above mentioned transmission control signals are provided. In FIG. 14, there are shown a video and audio signal generating device 101, a transmitter 102 and a receiver 103. The video and audio signal generating device 101 is coupled with the transmitter 102 by means of terminal groups 127, 128 and 129. The video signals are supplied through the terminal group 127 and the audio signals are supplied through the terminal group 128. The terminal group 129 is coupled with a signal code allocation control device 104 which receives data supplied from the signal generating device 101 through the terminal group 129 and determines signal transmitting timings. The signal code allocation control device 104 further effects the channel allocation, i.e., the device 104 produces control codes for effecting the channel allocation and actuates the video and audio signal generating device 101 at suitable timings. The video and audio signals generated by the device 101 are supplied through the terminal groups 127 and 128 to a video signal processing device 106 and an audio signal processing device 105, respectively. In these devices 106 and 105, the video and audio signals are suitably processed for the next multiplexing. The audio and video signals are then time division multiplexed in an audio multiplexing device 107 and a video multiplexing device 108, respectively. In a program material control code and video identification number adding device 109 to the video signals are added the program material control codes and the video identification numbers shown in FIGS. 11d and 11g and supplied from the allocation control device 104. In an audio start and end signal adding device 110, the audio start and end signals STX and ETX are added to the audio signals.

The item control codes shown in FIGS. 11e and 11f and supplied from the allocation control device 104 are added to the transmission signal in an item control code adding device 111. In this case, the item control codes are inserted in the code frames CF as shown in FIGS. 11b and 11c, which code frames CF are transmitted at a rate of one television frame for one second. Then, the output signals supplied from the adding devices 109, 110 and 111 are combined in a signal combining device 112 and the combined signal is once stored in a one master frame memory 130. The stored signal is repeatedly reproduced and is transmitted through a modulator 113 from an output terminal 114 to a transmission path 115. In general, the output terminal 114 is an antenna and the transmission path 115 is a space propagation path, but the transmission path 115 may be a cable and there may be many branches 116 so as to transmit the signal to a number of receivers.

Next a transmitting apparatus for use in the signal transmission system according to the invention will be described in detail.

FIG. 15 shows an embodiment of a PCM-TDM signal forming apparatus in which a plurality of audio signals are produced by microphones or audio tape recorders. In the drawing, reference numerals 131, 131', 131", 131'" . . . denote audio signal sources such as the microphones or the audio tape recorders. The audio signals from the audio signal sources 131, 131' . . . are supplied to an audio signal recorder 132 and are successively recorded in a series mode. The audio signal of the series form supplied from the audio signal recorder 132 is supplied to an A-D converter 133 and converted into an audio PCM signal. The output PCM signal from the A-D converter 133 is stored in a memory 134. Each address code of the memory 134 is predetermined so as to correspond to each sampling of the audio signal stored therein. The PCM audio signal stored in the memory 134 is once transferred to an auxiliary memory 135 and is rearranged in a multiplexed form. The PCM audio signal stored in the auxiliary memory 135 is recorded on a disc recorder at a suitable speed and thus the PCM signal is recorded as the multiplexed signal. A reference numeral 136 shows an allocation control logic circuit which divides the PCM signals stored in the memory 134 at the given time interval of 5 seconds and the divided PCM signals are multiplexed over the whole channels. The allocation control circuit 136 inserts the start signal STX or the end signal ETX at the given portion of the PCM frame at a transition of the audio signals during the time the PCM signal is transferred to the auxiliary memory 135. From an output terminal 137 is derived the audio signal in the form of PCM-TDM as shown in FIG. 13.

FIG. 16a shows the various audio signals $a, b, c, d, e$ . . . $z$ having different time lengths and supplied from the audio signal sources 131, 131', 131" . . . . These audio signals are recorded on an audio tape in a series form in the audio signal recorder 132 as shown in FIG. 16b. This audio signal chain is converted into the PCM signal in the A-D converter 133 and the converted PCM audio signal chain is stored in the memory 134. Under the control of the allocation logic 136, the PCM signal chain is divided at a time interval of five seconds and the divided segments are allocated to the odd number channels Ch 1, Ch 3, Ch 5 . . . Ch 95 and the even number channels Ch 0, Ch 2, Ch 4, Ch 6 . . . Ch 94 and are multiplexed as shown in FIG. 16c. During the channel allocation process described above, the audio signal start signal STX or the end signal ETX is inserted at a transition between the successive audio signals as shown in FIG. 16c.

At the receiver 103, the signal received at an input terminal 117 is demodulated by a demodulator 118 and at the same time the input signal is divided into the video signal and the audio signal. The control code transmitted with the video and audio signals is decoded by a transmission control code decoder 119 and the decoded control code is collated with a code set by the student through a selection input and answer input terminal 126. When these codes coincide with each other, the desired video signal of one television frame period is gated out by a video frame gate 122 and gated video signal is supplied to a frame video buffer memory 123 and stored therein. The stored video signal is repeatedly read out so as to form a continuous video signal which is supplied to a video output terminal 124.

At the same time the desired audio channel is detected at the transmission control code decoder 119 and the desired audio signal is selectively extracted by an audio channel selector 120. The extracted audio PCM signal is converted in a D-A converter 121 into an analogue audio signal which is supplied to an audio output terminal 125.

FIG. 17 illustrates a detailed construction of the receiver. In FIG. 17, a reference numeral 201 denotes an input terminal for receiving the still picture-sound broadcasting signal, 202 an input terminal for receiving a student's answer, 203 a video output terminal and 204 shows an audio output terminal. The receiver is constructed of a demodulating part 205, a timing control part 206, an item control part 207, a program material control part 208, an output part 209 and an answer generating part 243. The answer generating part 243 comprises the operating panel on which various operating buttons or switches are provided. The item control part 207 and the program material control part 208 constitute essential parts of the present invention and these control parts 207 and 208 correspond to the transmission control code decoder 119 shown in FIG. 14.

The still picture-sound signal received at the input terminal 201 is demodulated by the demodulator 210 and the demodulated signal is processed by a waveform equalizer 211. The output signal of the demodulating part 205 is supplied to the timing control part 206 and the output part 209. The signal supplied to the timing control part 206 is used to recover the audio signal and the control signal and the signal supplied to the output part 209 is used for reproducing the video signal. In the timing control part 206, at first bit clocks are extracted by a bit clock extracting circuit 212. The bit clock may be extracted by an ordinary method and the extracted bit clocks can be used as a reference timing for decoding the PCM audio signal and the transmission control code. On the basis of the bit clocks the waveforms of the output signal from the equalizer 211 are correctly shaped in a pulse regenerator 213. The output signal of the equalizer 211 contains noise at the transmission path, but the output signal from the pulse regenerator 213 does not contain noise and has a complete pulse waveform. The audio signal and the control signal are decoded from the thus regenerated pulses.

The timing part 206 comprises a PCM frame synchronizing signal detector 214, a sub-frame, video-audio frame and television frame synchronizing signal detector 215 and a master frame synchronizing signal detector 216 and these detectors produce pulses synchronized with the PCM frame, television frame, video-audio frame, sub-frame and master frame having repetition frequencies of 10.5 KHz, 30 Hz, 10 Hz, 1 Hz and 0.2 Hz, respectively. On the basis of pulses synchronized with the PCM frame, television frame, video-audio frame and sub-frame, a gate pulse generator 217 produces corresponding gate pulses. These gate pulses serve to extract the time slots of CF, LBL, VID, STX and ETX in the timing chart shown in FIG. 11.

The item control part 207 operates as follows in accordance with the flow chart illustrated in FIG. 10. The student operates the answer generator 243 to supply a selection input through the terminal 202, which selection input denotes the numbers of the list, block and item of a desired program material which should be displayed firstly. The selection input is once stored in a register 224. The selection input is immediately supplied to a LBI register 221 through a register control circuit 223 and in the LBI register 221 the numbers of the list, block and item are stored. At the initial time of the program selection, the LBI numbers are particularly determined, for example as "0, 0, 0" so that the above operation is quite simple. In case of denoting a particular item, returning to the first item of a block (Return), repeating the same item (Repeat) and returning back to a previous item (Back), the LBI numbers are directly determined and thus these operations are rather simple.

The output from the LBI register 221 is supplied to a comparator circuit 219 and also to a label register 245. The content of the label register 245 is supplied to the program material control part 208 as the LBL signal. The LBI signal supplied to the comparator circuit 219 is compared with the LBI signal in the item table extracted by a ROW gate 218 from the output of the pulse regenerator 213 and the comparator circuit 219 extracts the ROW having the same LBI number as that stored in the LBI register 221. The extracted ROW signal is supplied to a branch decision circuit 220.

As will be explained later, the video and audio signals selected by the program material control part 208 are reproduced. The student looks at a still picture or still pictures and listens to a sound or sounds and operates the answer generator 243 to produce the answer input code which is supplied through the terminal 202 to the register 224 and stored therein. The stored code is supplied to the branch determination circuit 220 which extracts the LBI of a next item from the ROW signal derived out by the comparator circuit 219 in accordance with the answer code. The LBI thus determined is supplied to the LBI register 221 and the LBI signal previously stored in the LBI register 221 is renewed by the new LBI signal. By means of this new LBI, the next program material and ROW are selected. The above operation is successively repeated to construct the desired program.

In addition to the above functions, there are many functions such as RETURN, REPEAT, BACK, etc. The RETURN function is to return to the first item in the related block. When the RETURN is effected by the student at the answer generator 243, the item number I of the LBI stored in the LBI register 211 is altered to the first item number of the related block by means of the register 224 and the register control circuit 223. The first item number I may be simply determined as, for example, I=0.

The REPEAT function is to repeat the related LBI once again. When the REPEAT request is given by the answer generator 243 to the register 224, the repeat trigger is effected for the LBI register 221 by means of the register control circuit 223.

The BACK function is to go back to the item which precedes with respect to the related item by one. But, some items have a plurality of input branches and thus the BACK function cannot be carried out by simply decreasing the item number by one. For this purpose, there is provided a second LBI register 222 which stores the preceding LBI. That is to say, each time the LBI stored in the register 221 is altered, the stored LBI is transferred to the second LBI register 222 and when the BACK operation is requested, the LBI stored in the second LBI register 222 is transferred through the register control circuit 223 to the first LBI register 221. In this case, the content of the second LBI register 222 is renewed by the related LBI and thus if the BACK operation is repeatedly requested, the LBI signals stored in the registers 221 and 222 are alternatively read out.

On the basis of the label progression control code C, the register control circuit 223 controls the LBL stored in the LBL register 245. That is to say, when the control code C is 1, each time the display of a single label is ended, the LBL number stored in the LBL register 245 is increased by one. Thus, when the control codes C of successive labels are 1, these labels are automatically displayed in succession without any operation of the student. In the program material control part 208 LABEL ( ≡ LBI) supplied from the LBL register 245 is compared at a comparator 226 with the program material control code extracted by an S-ROW gate 225. When the coincidence of the LBL number is detected, the VID number included in the S-ROW of the related LBL is stored in a VID register 227, ACH is stored in an ACH register 228 and the control codes C and KR are stored in a C and KR register 244. When the control code KR is 1 in the repeat or back operation, the register control circuit 223 inhibits the registers 227 and 228 to transfer the VID and ACH stored therein.

The VID number stored in the VID register 227 is compared at a VID comparator 230 with the gated VID number which is gated out at a VID gate 229 by means of a gate pulse produced by the gate pulse generator 217. When the coincidence of the VID numbers is detected, a video signal gate pulse generator 240 is triggered to produce a gate pulse which is supplied to a video gate 241. In this manner, the desired video signal having the desired VID code added thereto can be selectively extracted.

The ACH code stored in the ACH register 228 is compared at a comparator 232 with the audio start signal STX gated out by an STX gate 231 and when the ACH code coincides with the STX signal, a PCM channel selection pulse generator 236 is actuated to produce a PCM channel selection pulse which is supplied to an audio gate 237 so as to extract the PCM audio signal in the desired channel.

The ACH code stored in the ACH register 228 is also supplied to a comparator 234 through an adder 235 which increases the ACH code number by one each time the master frame MF is changed. At the comparator 234 the ACH code is compared with the audio end signal ETX gated out by an ETX gate 233. When the coincidence of the ACH code and the signal ETX is detected, the PCM channel selection pulse generator 236 is stopped so as to close the audio gate 237. The PCM channel selection pulse generator 236 generates the gate pulses for the audio gate 237 on the basis of the ACH codes, the timing pulses supplied from the bit clock extractor 212 and the PCM frame synchronization detector 214. The reason for increasing the ACH code by one in the adder 235 each time the master frame MF is changed is that as shown in FIG. 5a the audio signal having a time length longer than the master frame period is folded back at the end of the master frame and shifted to a next channel so as to form a loop and thus at the receiver end the ACH number must be also shifted in accordance with the transmitted signal. For this purpose, the adder 235 receives the master frame synchronizing signal from the master frame synchronization detector 216. However, if at the transmitter end the channel arrangement in each master frame is so changed cyclically that at the receiver end the audio signal can be extracted from the same audio channel, it is not necessary to provide the adder 235.

In the manner mentioned above, the desired video and audio signals are extracted at the output part 209. The video gate pulse generator 240 produces the gate pulse with the aid of the triggering pulse from the comparator 230 and the video synchronizing signal separated from the PCM multiplexed synchronizing signal by the synchronizing signal separating circuit 239. The gate pulse thus produced is supplied to the video gate 241 to gate out the desired video signal. The video signal gated out by the video gate 241 is the still picture video signal of one television frame which must be converted into a continuous television signal for displaying the still picture. To this end, the gated out video signal is once stored in a buffer memory 242 and the stored video signal is continuously read out on the basis of the synchronizing signal supplied from the synchronizing signal separating circuit 239 so as to produce the continuous television signal at a video output terminal 203.

The audio PCM signal gated out by the audio gate 237 is converted in a D-A converter 238 into an ordinary analogue audio signal which is derived from an audio output terminal 204.

FIGS. 18 and 19 show detailed flow charts for explaining the typical operations of the receiver set shown in FIG. 17. As illustrated in FIG. 18, the control panel of the keyboard, i.e., the response generator 243 comprises a lamp 250 for indicating the allowance of the response input, a digit indicating part 251, a start button (ST) 252, a clear button (C) 253, ten keys 254, an advance button (A) 255, a correct answer request button (CA) 256, a hint request button (HLP) 257, a return button (RT) 258, a back button (BK) 259 and a repeat button (RP) 260. The receiver set further comprises a display panel having a television display tube 261 and a speaker 262.

At first, the student depresses the start button ST on the keyboard 243 as shown in FIG. 19. In FIG. 19, the operations at the keyboard 243, the keyboard control, the item control, the program material control and the display control are denoted by KB, KBC, IC, SC and DC, respectively. At the keyboard control, the response flag RSP FLG is switched off by means of the start signal. Then the lamp 250 on the control panel is switched off. Further, the D-A converter 138 shown in FIG. 17 is made inoperable so that the reproduction of the audio signal is stopped. Then, in the item control the contents of the first and second LBI registers 221 and 222 are set to L=0, B=0 and I=0. Next, the program material control is effected with the aid of the LBL which is equal to the LBI and the video identification code V-ID and the audio channel number A-CH are determined by the program material control table S-ROW. Then in the display control the desired video and audio signals denoted by the above V-ID and A-CH and are reproduced by the television display tube 261 and the speaker 262. Usually, this display indicates titles of the programed instructions which are simultaneously transmitted. If the control code C of the selected label is 0, the D-A converter 138 is disabled after this label has been displayed. Then, the response flag is switched on and thus the lamp 250 is turned on to indicate that the student can operate the ten keys 254.

Then the student actuates the clear button 253 and previous contents stored in a number register provided in the receiver set are cleared. Next, the student depresses one or more keys according to the displayed title and the number corresponding to the depressed key or keys is stored in the number register. At the same time, this number is indicated by the digit indicating part 251. After the student certifies the indicated number, he operates the advance button 255. As shown in FIG. 18, the signal caused by depressing the run button 255 is effective only when the response flag is switched on. Then the response flag is switched off and the D-A converter 138 is disabled. Hereinafter the series of operations mentioned above will be expressed by KB and ANS for the sake of simplicity in FIG. 19.

The item control checks whether or not $LBI_0$ stored in the first LBI register is 0, 0, 0. In this case, $LBI_0$=000. Then, the L number of the $LBI_0$ is set by the number, for example, 3 stored in the number register. The LBI code (300) having the thus set L number is stored in the first LBI register 221 and the LBI code of 000 which has been stored in the register 221 is transferred to the second LBI register 222.

Next, in the program material control, the video identification number V-ID and the audio channel number A-CH are determined with the aid of the new LBL=300. In the display control the video and audio signals denoted by V-ID and A-CH are extracted and displayed in the manner described above. In this case, if the control code C of this LBL=300 is 1, then the label number is automatically increased by one and the content of the next label LBL=301 is sequentially displayed.

Usually this item having LBI=300 contains a question and thus the student must reply to the question by depressing a one or more keys. In this case, since the LBI stored in the first LBI register 221 is not equal to 000, a next item is selected by the reply number given by the student on the basis of the item control table. The LBI of this next item is stored in the first register 221 and the LBI=300 which has been stored in the first LBI register 221 is transferred to the second LBI register 222 and stored therein. Then the first label of the related item is displayed.

The operations of the correct answer request, the hint request, the return, the back and the repeat are obvious with reference to the flow charts shown in FIGS. 18 and 19 and thus the detailed explanation is not needed.

The present invention is not limited to the embodiments described above and many modifications may be effected. For example, in the transmission system for transmitting all of the information signals and the control signals in a given time period, each terminal receiver may comprise a memory for storing the transmitted signals of said given time period ad desired information signals may be selectively reproduced under the control of the control signal. In such a case, the construction of the terminal receiver becomes complicated, because each terminal receiver has to comprise a memory of rather large capacity. In order to avoid such a disadvantage, there may be provided a common head end at the receiver end and a plurality of receivers are connected to the head end. The head end comprises the memory for storing the transmitted signals in the given time period. In this case, the information signals and the control signal stored in the memory in the head end are repeatedly reproduced and transmitted to each terminal receiver. Moreover, there may be provided a two-way transmission path between the head end and each terminal receiver. In such a case, the desired information signal may be selectively transmitted from the head end to each terminal receiver.

In the above embodiments the video and/or audio signals are transmitted through a single transmission path, but for example in case of adopting a CATV system having a plurality of television channels and a FM band and a data transmission channel, the video and audio signals may be transmitted through one or more television channels and the control signal may be transmitted through the data transmission channel. Moreover, the video and/or audio signals may be transmitted as frequency division multiplexed signals.

What is claimed is:

1. A signal transmission system for transmitting programmed information including signals corresponding to a plurality of program materials, comprising at a transmitter end:
  a program material source for producing said signals corresponding to said plurality of program materials;
  means for producing a plurality of identification signals a respective one of which denotes each of said signals corresponding to said plurality of program materials;
  means for producing a plurality of label signals each of which denotes a minimum program material group comprising a minimum significant information unit composed of one or more of said signals corresponding to said program materials;
  means for receiving said identification and label signals to form a program material control signal composed of a plurality of combinations of said label and identification signals, each of said combinations including a respective label signal and one or more identification signals which denote one or more of said signals corresponding to said program materials in said minimum program material group denoted by said respective label signal;
  composite signal forming means for receiving said signals corresponding to said program materials and said program material control signal to form a composite signal; and
  means for transmitting said composite signal; and at a receiver end:
  means for receiving said composite signal;
  means for reproducing at least a part of said program material control signal from the received composite signal;
  label determining means for determining a label signal of a minimum program material group to be displayed;
  identification signal detecting means for receiving said reproduced program material control signal and said determined label signal to detect one or more identification signals which form one of said combinations in said reproduced program material control signal together with said determined label signal;
  means for extracting from the received composite signal a minimum program material group of one or more of said signals corresponding to said program materials denoted by said one or more detected identification signals; and
  means for displaying said one or more extracted signals corresponding to said program materials.

2. A signal transmission system according to claim 1, wherein said label determining means provided at the receiver end comprises:
  a label denoting member which is actuated by a user to produce a label signal of a minimum program material group to be displayed; and
  means for supplying said label signal to said identification signal detecting means.

3. A signal transmission system according to claim 2, wherein said system further comprises at the transmitter end:
  means for adding an automatic program progress control signal to given successive combinations in said program material control signal, the label signals included in said successive combinations denoting successive minimum program material groups which are to be successively displayed; and at the receiver end:
  means for detecting said automatic program progress control signal in said reproduced program material control signal;
  means for receiving said reproduced program material control signal and said detected automatic program progress control signal to determine automatically said successive label signals in said successive combinations to which said automatic program progress control signal is added; and
  means for supplying successively said determined successive label signals to said identification signal detecting means to detect said successive minimum program material groups to be displayed.

4. A signal transmission system according to claim 1, wherein said system further comprises at the transmitter end:
  means for receiving said label signals and forming a program progress control signal composed of a plurality of combinations of said label signals, each of said combinations including a respective label signal denoting a respective minimum program material group and one or more label signals denoting one or more minimum program material groups any one of which can be displayed next to said respective minimum program material group; and means for supplying said program progress control signal to said composite signal forming means; and at the receiver end:

means for reproducing said program progress control signal;

present label storing means for storing the label signal of the presently displayed minimum program material group supplied from said label determining means;

next label determining means for receiving said reproduced program progress control signal and said stored label signal to determine a next label signal of a minimum program material group which is to be displayed next to said presently displayed minimum program material group; and means for supplying said determined next label signal to said identification signal detecting means.

5. A signal transmission system according to claim 4, wherein said next label determining means provided at the receiver end comprises:

a response input member which is actuated by a user to produce a response signal; and means for receiving said response signal and said program progress control signal to select one label signal from one or more label signals which form said combination in said program progress control signal together with said stored label signal denoting the presently displayed minimum program material group.

6. A signal transmission system according to claim 4, wherein said means for forming said program material control signal comprises means for making a plurality of rows each of which includes a label signal formed by a digit composed of a given number of bits and one or more identification signals denoting one or more of said signals corresponding to said program materials comprising a minimum program material group denoted by a label signal related to said stored label signal denoting the presently displayed minimum program material group in said program progress control signal, and said identification signal means provided at the receiver end comprises next label storing means for storing the digit of the next label signal determined by said next label determining means;

first comparing means for comparing bit-by-bit said stored digit of said next label signal with digits of successive label signals in said reproduced program material control signal to produce a first coincidence signal when these digits coincide with each other;

first row extracting means for receiving said first coincidence signal and said reproduced program material control signal to extract one row of said program material control signal, said extracted row including the label signal which has the same digit as that of said stored next label signal; and means for extracting one or more identification signals in said extracted row.

7. A signal transmission system according to claim 6, wherein said means for forming said program progress control signal comprises means for forming a plurality of rows of signals each of which includes an indexing label signal and one or more branching label signals denoting one or more minimum program material groups any one of which can be displayed next to the minimum program material group denoted by said indexing label signal, each of said indexing label and branching label signals being formed by a digit composed of a given number of bits, and said label determining means provided at the receiver end comprises:

second comparing means for comparing bit-by-bit said digit of the label signal stored in said present label storing means with digits of the successive indexing label signals in said program progress control signal to produce a second coincidence signal when these digits coincide with each other;

second row extracting means for extracting in response to said second coincidence signal one row of signals in said program progress control signal, said extracted row including the indexing label signal which has the same digit as that of said stored label signal denoting the presently displayed minimum program material group;

a response input member which is actuated by the user to produce a response signal; and means for receiving said response signal and said extracted row to select one branching label signal in said extracted row of the program progress control signal.

8. A signal transmission system according to claim 7, further comprising at the transmitter end:

means for adding an automatic program progress control signal to given rows of signals of said program material control signal, said given rows including label signals denoting given minimum program material groups which are to be successively displayed in an automatic program progress control mode; and at the receiver end:

means for detecting said automatic program progress control signal inserted in the extract row of said program material control signal;

means for storing said detected automatic program progress control signal;

means for determining in response to said stored automatic program progress control signal a label signal of a minimum program material group which is to be displayed next to the presently displayed minimum program material group; and means for rewriting the content in said next label storing means by said determined label signal.

9. A signal transmission system according to claim 8, wherein said means for adding said automatic program progress control signal provided at the transmitter end comprises:

means for forming given label signals in said given rows of said program material control signal as sequential number digits, said label signal denoting the minimum program material groups which are to be successively displayed at the receiver end in the automatic program progress mode; and said means provided at the receiver end for determining the successive label signal in response to said stored automatic program progress control signal comprises means for changing the digits of successive label signals which are successively stored in said next label storing means by one digit.

10. A signal transmission system according to claim 8, wherein said signals corresponding to said program materials are still picture video signals each of which is inserted in a television frame period and audio signals which are inserted in a plurality of channels as audio multiplexed signals and said system further comprises at the transmitter end:

means for transmitting repeatedly said video and audio signals alternately at a given period;

means for transmitting each row of said program progress control signal in one video signal transmission period at a period which is equal to an integer multiple of said given period; and means for transmitting each of said rows of said program material control signal in parts of the video and audio signal transmission periods at a time instance preceding to the signals corresponding to said program materials which are to be controlled by the related row of said program material control signal.

11. A signal transmission system according to claim 10, wherein each of said identification signals in said program material control signal includes a video identification signal for identifying each still picture video signal, an audio channel through which the audio signal is transmitted and audio start and end signals for denoting start and end timings of the audio signal.

12. A signal transmission system according to claim 7, wherein said transmitting means provided at the transmitter end comprises:

means for transmitting said signals corresponding to said program materials, said program material control signal and said program progress control signal in a given time period; and said system comprises at the receiver end:

means for storing all of said signals corresponding to said program materials, said program progress control signal and said program material control signal; and means for reading out selectively the content of said storing means.

13. A signal transmission system according to claim 7, wherein said transmitting means provided at the transmitter end comprises:

means for transmitting said signals corresponding to said program materials, said program progress control signal and said program material control signal once in a given time period;

and said system further comprises at the receiver end:

means for storing said signals corresponding to said program materials, said program progress control signal and said program material control signal;

means for reading out repeatedly the content stored in said storing means; and a plurality of terminal receivers each of which receives said read-out signals corresponding to said program materials, program progress control signal and program material control signal.

14. A signal transmission system according to claim 7, wherein said signals corresponding to said program materials are instruction program material signals including at least one correct answer program material group and at least one hint program material group and said system further comprises at the transmitter end means for inserting in at least one row of said program progress control signal a correct answer label signal and a hint label signal which denote the correct answer program material group and the hint program material group, respectively relating to the program material group denoted by the indexing label signal in a related row; and means for inserting in said program material control signal at least one row which includes said correct answer label signal and at least one identification signal denoting at least one correct answer program material signal composing said correct answer program material group denoted by said correct answer label signal and at least one row which includes said hint label signal and at least one identification signal denoting at least one hint program material signal composing said hint program material group denoted by said hint label signal; and at the receiver end a correct answer request member which is actuated by the user to produce a correct answer request signal;

a hint request member which is actuated by the user to produce a hint request signal;

means for receiving said extracted row of the program progress control signal and said correct answer request signal to extract said correct answer label signal in said extracted row which includes the indexing label signal of the presently displayed minimum program material group; and means for receiving said row of the program progress control signal and said hint request signal to extract said hint label signal in said extracted row.

15. A signal transmission system according to claim 7, wherein said system further comprises at the receiver end a repeat request member which is actuated by the user to produce a repeat request signal; and means for receiving said repeat request signal to supply the label signal of the present displayed minimum program material group stored in said present label storing means to said identification signal detecting means, whereby said presently displayed minimum program material group denoted by said label signal is repeatedly displayed.

16. A signal transmission system according to claim 7, wherein said system further comprises at the receiver end a back request member which is actuated by the user to produce a back request signal;

last label storing means for storing the label signal of the minimum program material group which has been displayed just before the presently displayed minimum program material group; and means for receiving said back request signal to supply said stored label signal to said identification signal detecting means, whereby said last displayed minimum program material group is once again displayed.

17. A signal transmission system according to claim 7, wherein said means provided at the transmitter end for forming the program progress control signal comprises:

means for forming item signals each of which denotes a group of one or more of said minimum program material groups denoted by one or more of said label signals and is formed by a digit composed of a given number of bits;

means for forming block signals each of which denotes a group of one or more minimum program material groups denoted by one or more of said item signals and is formed by a digit composed of a given number of bits;

means for forming list signals each of which denotes a group of one or more of said minimum program material groups denoted by one or more of said block signals and is formed by a digit composed of a given number of bits;

means for receiving said item, block and list signals to form each of said indexing label signals in said program progress control signal by means of a combination of said digits of said item, block and list signals to which said indexing label signal belongs;

means for receiving said item signals to form each of said branching label signals in each row of said program control signal by means of only said digit of the item signal to which said branching label signal belongs;

means for adding to said row of said program progress control signal a combination of said digits of the block and item signals to which all of said branching label signals in said row belong; and said means provided at the receiver end for selecting the branching label signal comprises:

list-block extracting means for extracting said combination of the digits of the block and item signals from the extracted row of the program progress control signal;

item extracting means for extracting one item signal in said extracted row of the program progress control signal in response to said response signal supplied from said response input member; and means for combining digits of said extracted list, block and item signals to form said combination digit of the label signal denoting said minimum program material group which is to be displayed next to the presently displayed minimum program material group.

18. A signal transmission system according to claim 17, wherein said system further comprises at the receiver end:

a back request member which is actuated by the user to produce a back request signal;

means for producing a particular digit representing a label signal which denotes a first minimum program material group in the block signal; and means for receiving said back request signal to supply said particular digit of the label signal to said next label storing means.

19. A signal transmission system according to claim 17, wherein said means provided at the transmitter end for forming the program progress control signal comprises:

means for forming at least one row in which said indexing label signal is expressed by a particular list digit and each of said branching label signals being formed by a combination of the block and list digits, and said system further comprises at the receiver end:

means for detecting said particular list digit in the extracted row of the program progress control signal to produce a particular list signal;

means for receiving said particular list signal to form a particular item digit;

means for receiving said response signal and said extracted row to select one combination of block and list digits in said extracted row; and means for supplying said particular item digit and said selected one combination of block and list digits to said combining means to form a particular combination of digits of the particular label signal denoting a minimum program material group which is to be displayed next to the presently displayed minimum program material group and belongs to a particular item signal in a different block signal than that to which the presently displayed minimum program material group belongs.

20. A signal transmission system according to claim 19, wherein said system further comprises at the receiver end:

a start member which is actuated by the user to produce a start signal;

means for producing a particular combination of item, block and list digits; and means for receiving said start signal to supply said particular combination of item, block and list digits to said next label storing means.

21. A signal transmission system according to claim 17, wherein said system further comprises at the receiver end:

a repeat request member which is actuated by the user to produce a repeat request signal;

means for storing the combination of digits of the item, block and list signals to which the presently displayed minimum program material group belongs, said combination of digits representing the label signal of the first minimum program material group among the minimum program material groups denoted by said item signal; and means for receiving said repeat request signal to supply said stored combination of digits to said next label storing means; whereby the minimum program material groups belonging to said item signal are repeatedly displayed from the beginning thereof.

22. A signal transmission system according to claim 21, wherein said system further comprises at the transmitter end means for adding an automatic program progress control signal to given rows of said program material control signal, said given rows including label signals denoting given minimum program material groups which are to be successively displayed in an automatic program progress mode; and means for adding an inhibit signal to at least a first one row of said given rows of the program material control signal, said at least first one row including a label signal denoting a minimum program material group which should not be displayed in the repeat operation; and at the receiver end;

means for detecting said automatic program progress control signal inserted in the extracted row of the program material control signal;

means for detecting said inhibit signal in said extracted row of the program material control signal;

means for detecting in response to said automatic program progress control signal a label signal of a minimum program material group which is to be displayed next to the presently displayed minimum program material group;

means for supplying said detected label signal to said next label storing means; and means for receiving said inhibit signal to inhibit the supply of said detected label signal to said next label storing means, whereby when the minimum program material group denoted by the label signal having said automatic program progress signal added thereto is displayed and said repeat request member is actuated, the minimum program material groups belonging to said item signal except for at least a first one minimum program material group denoted by the label signal in said at least first one row to which said inhibit signal is added are selectively displayed in the automatic program progress mode.

23. A signal transmission system according to claim 17, wherein said system further comprises at the receiver end:

a back request member which is actuated by the user to produce a back request signal;

means for storing the first label signal in the preceding item signal which has been displayed just before the presently displayed item signal; and means for receiving said back request signal to supply said stored label signal of the preceding item signal to said identification signal detecting means, whereby one or more minimum signals corresponding to said program materials denoted by said preceding item signal are once again displayed from the minimum program material group denoted by said first label signal.

24. A signal transmission system according to claim 23, wherein said system further comprises at the transmitter end:

means for adding an automatic program progress control signal to given rows of said program material control signal, said given rows including label signals denoting given minimum program material groups which are to be successively displayed in an automatic program progress mode; and means for adding an inhibit signal to at least first one row of said given rows of the program material control signal, said at least first one row including a label signal denoting a minimum program material group which should not be displayed in the back operation; and at the receiver end:

means for detecting said automatic program progress control signal inserted in the extracted row of the program material control signal;

means for detecting said inhibit signal in said extracted row of the program material control signal;

means for receiving said program material control signal and said automatic program progress control signal to detect a label signal of a minimum program material group which is to be displayed next to be the presently displayed minimum program material group;

means for supplying said detected label signal to said next label storing means; and means for receiving said inhibit signal to inhibit the supply of said detected label signal to said next label storing means, whereby when said back request member is actuated and the minimum program material groups belong to said preceding item signal are requested to be displayed, the program material groups belonging to said preceding item signal except for at least one minimum program material group denoted by the label signal in said at least first one row to which said inhibit signal is added are selectively displayed in the automatic program progress mode.

* * * * *